US012536297B2

(12) United States Patent
Kamimura et al.

(10) Patent No.: US 12,536,297 B2
(45) Date of Patent: Jan. 27, 2026

(54) ANALYSIS CONDITION GENERATING APPARATUS, ANALYSIS SYSTEM, ANALYSIS CONDITION GENERATING PROGRAM, ANALYSIS PROGRAM, ANALYSIS CONDITION GENERATING METHOD, AND ANALYSIS METHOD

(71) Applicant: NEC Corporation, Tokyo (JP)

(72) Inventors: Junpei Kamimura, Tokyo (JP); Kazuhiko Isoyama, Tokyo (JP); Yoshiaki Sakae, Tokyo (JP)

(73) Assignee: NEC CORPORATION, Tokyo (JP)

( * ) Notice: Subject to any disclaimer, the term of this patent is extended or adjusted under 35 U.S.C. 154(b) by 227 days.

(21) Appl. No.: 18/281,235

(22) PCT Filed: Mar. 19, 2021

(86) PCT No.: PCT/JP2021/011367
§ 371 (c)(1),
(2) Date: Sep. 8, 2023

(87) PCT Pub. No.: WO2022/195848
PCT Pub. Date: Sep. 22, 2022

(65) Prior Publication Data
US 2024/0160746 A1 May 16, 2024

(51) Int. Cl.
G06F 21/57 (2013.01)
(52) U.S. Cl.
CPC ...... G06F 21/577 (2013.01); G06F 2221/034 (2013.01)

(58) Field of Classification Search
None
See application file for complete search history.

(56) References Cited

U.S. PATENT DOCUMENTS 8,532,978 B1* 9/2013 Turner ............... G06F 40/211
704/7
2007/0120357 A1 5/2007 Kapadi et al.
(Continued)

FOREIGN PATENT DOCUMENTS

JP 2018-005690 A 1/2018
JP 2019-192101 A 10/2019
(Continued)

OTHER PUBLICATIONS

Guizzardi et al. "Ontology-Based Model Abstraction", Conceptual and Cognitive Modeling Research Group, IEEE 2019. (Year: 2019).*
(Continued)

Primary Examiner — Kaveh Abrishamkar
(74) Attorney, Agent, or Firm — Sughrue Mion, PLLC

(57) ABSTRACT

An analysis condition for security risk for a data flow in a system to be analyzed is automatically generated. An analysis condition generating apparatus 1A generates from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, and generates an analysis condition for analyzing security risk for the system to be analyzed based on the graph structural data.

14 Claims, 18 Drawing Sheets

(56) References Cited

U.S. PATENT DOCUMENTS

| | | | | |
|---|---|---|---|---|
| 2007/0226796 A1* | 9/2007 | Gilbert | ................. | G06F 21/577 |
| | | | | 726/25 |
| 2018/0046928 A1* | 2/2018 | Jang | ................... | H04L 63/1416 |
| 2022/0138327 A1* | 5/2022 | Panicker | ............... | G06F 21/577 |
| | | | | 726/25 |
| 2022/0191250 A1* | 6/2022 | Laliberte | ................ | H04L 63/20 |
| 2022/0292121 A1* | 9/2022 | Pfitzmann | .............. | G06N 5/025 |

FOREIGN PATENT DOCUMENTS

| | | |
|---|---|---|
| WO | 2007/064516 A2 | 6/2007 |
| WO | 2007/109721 A2 | 9/2007 |
| WO | 2019/142335 A | 7/2019 |

OTHER PUBLICATIONS

Syed et al. "UCO: A Unified Cybersecurity Ontology", The Workshops of the Thirtieth AAAI Conference on Artificial Intelligence, Technical Report WS-16-03, 2016. (Year: 2016).*
Dessi et al. "Generating Knowledge Graphs by Employing Natural Language Processing and Machine Learning Techniques within the Scholarly Domain", Dept. of Math, University of Cagliari, Nov. 3, 2020. (Year: 2020).*
JP Office Action for JP Application No. 2023-506665, mailed on Jun. 4, 2024 with English Translation.
Written opinion for PCT Application No. PCT/JP2021/011367, mailed on Jun. 1, 2021.
International Search Report for PCT Application No. PCT/JP2021/011367, mailed on Jun. 1, 2021.

* cited by examiner

- (Process) -(execute) - > (Process)
- (Process) -(read/write) - > (File)
- (Process) -(has) - >(Execution Permission)
- (File)-(has)- >(Permission)
  . . .

Fig. 5A

JVNDB-2015-0061XX:
There are a plurality of vulnerabilities in XXXX Solution Center, and any code cen be ececuted with SYSTEM permission by the attacker.

The Process LSCTaskService executing with the SYSTEM permission is generated upon starting XXXX Solution Center. This process implements the execution of method in the LSCController.dll module with the "GET REQUEST" and the "POST REQUEST" by executing the "HTTP daemon" using the "55555 port number". A large number of unsafety methods are included in the LSCController.dll. The RunInstaller among them is designed to execute any code on the %APPDATA%¥LSC¥Local Store directory. Since this directory is created for all user that is able to log in the system, the user can write in the directory without the administrative permission. General user can execute any code with SYSTEM permission by misusing the vulnerability.

...

Fig. 7A

ANALYSIS CONDITION GENERATING APPARATUS, ANALYSIS SYSTEM, ANALYSIS CONDITION GENERATING PROGRAM, ANALYSIS PROGRAM, ANALYSIS CONDITION GENERATING METHOD, AND ANALYSIS METHOD This application is a National Stage Entry of PCT/JP2021/011367 filed on Mar. 19, 2021, the contents of all of which are incorporated herein by reference, in their entirety.

TECHNICAL FIELD

The present invention relates to an analysis condition generating apparatus, an analysis system, an analysis condition generating program, an analysis program, an analysis condition generating method, and an analysis method.

BACKGROUND ART

In recent years, it is preferred to enhance security in a system connected to a network, and service for analyzing security risk for the system is provided such as vulnerability assessment and penetration test.

The vulnerability assessment is a method for comprehensively understanding based on definition of known vulnerability such as a SQL injection and Cross-Site Request Forgeries, the vulnerability inherent in the system and lackness of a security function. The penetration test is a method for analyzing based on an attacking scenario prepared in advance, whether an attacking goal is achieved with attack to the system, and understanding possibility in damage to the system.

For example, PTL 1 discloses a technique for generating information on evaluating the vulnerability in a target system to be analyzed based on a standard and a specification used by the target system to be analyzed and disclosed vulnerability information.

Also, for example, PTL 2 discloses a technique for obtaining as a threat list, a list of threat with the attack to a software processing and a vulnerability description in which the processing with the vulnerability to the threat is described, and determining, from a software processing flow, a vulnerable point included in the threat list.

CITATION LIST

Patent Literature

[PTL 1] JP 2019-192101
[PTL 2] JP 2019/142335

SUMMARY

Technical Problem

The vulnerability assessment can comprehensively verify entire the system, whereas it is difficult to understand undefined vulnerability for example. Also, the penetration test can verify a specific invasion method to the system, whereas it involves a problem in which cost and time are increased when comprehensively analyzing the system. For such problem, a security risk analysis is performed focusing on treating data in the system to be analyzed.

In the technique disclosed in PTL 1, the vulnerability is evaluated in the standard and the specification used by the target system to be analyzed. That is, the technique disclosed in PTL 1 is not for analyzing the security risk focusing on treating the data in the system to be analyzed, and thus, cannot evaluate the undefined vulnerability and vulnerability not in the standard and the specification used by the system to be analyzed.

Also, in the technique disclosed in PTL 2, the vulnerability description included in the threat list is obtained from a CWE (Common Weakness Enumeration). For the CWE, since a wide variety of types of vulnerabilities are hierarchized and abstracted, it is necessary to embody the vulnerability for each software processing flow when determining the vulnerable point by applying to the software processing flow. Therefore, large amount of rules for embodiment are required when comprehensively analyzing the system, and so, the problem cannot be solved in which cost and time are increased.

An object of the present invention is made for solving the above problem, and is to automatically generate an analysis condition for security risk for a data flow in the system to be analyzed.

Solution to Problem

An analysis condition generating apparatus according to the present invention includes an analysis condition generating unit configured to generate from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, and generate based on the graph structural data, an analysis condition for analyzing security risk for the system to be analyzed.

An analysis system according to the present invention includes a structural information generating unit configured to generate from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, an abstraction processing unit configured to transform into an abstraction identifier, a unique identifier for the nodes and the edges included in the graph structural data, and an analysis processing unit configured to analyze security risk for the system to be analyzed based on the analysis condition generated from the graph structural data in which the unique identifier is transformed into the abstraction identifier.

An analysis condition generating program according to the present invention causes a processor to execute generating from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, and generating based on the graph structural data, an analysis condition for analyzing security risk for the system to be analyzed.

An analysis program according to the present invention causes a processor to perform generating from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, transforming into an abstraction identifier, a unique identifier for the nodes and the edges included in the graph structural data, and analyzing security risk for the system to be analyzed based on the analysis condition generated from the graph structural data in which the unique identifier is transformed into the abstraction identifier.

An analysis condition generating method according to the present invention includes generating from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, and generating based on the graph structural data, an analysis condition for analyzing security risk for the system to be analyzed.

An analysis method according to the present invention includes generating from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, transforming into an abstraction identifier, a unique identifier for the nodes and the edges included in the graph structural data, and analyzing security risk for the system to be analyzed based on the analysis condition generated from the graph structural data in which the unique identifier is transformed into the abstraction identifier.

Advantageous Effects of Invention

According to the present invention, the analysis condition can be automatically generated for the security risk for the data flow in the system to be analyzed. It is noted that in addition to or alternative to the above effect, other effect may be provided according to the present invention.

BRIEF DESCRIPTION OF THE DRAWINGS

FIG. 5A is a diagram illustrating a description of ontology according to the first example embodiment;

FIG. 7A is a diagram showing an example of a natural sentence according to the first example embodiment;

DESCRIPTION OF THE EXAMPLE EMBODIMENTS

Figure 1:
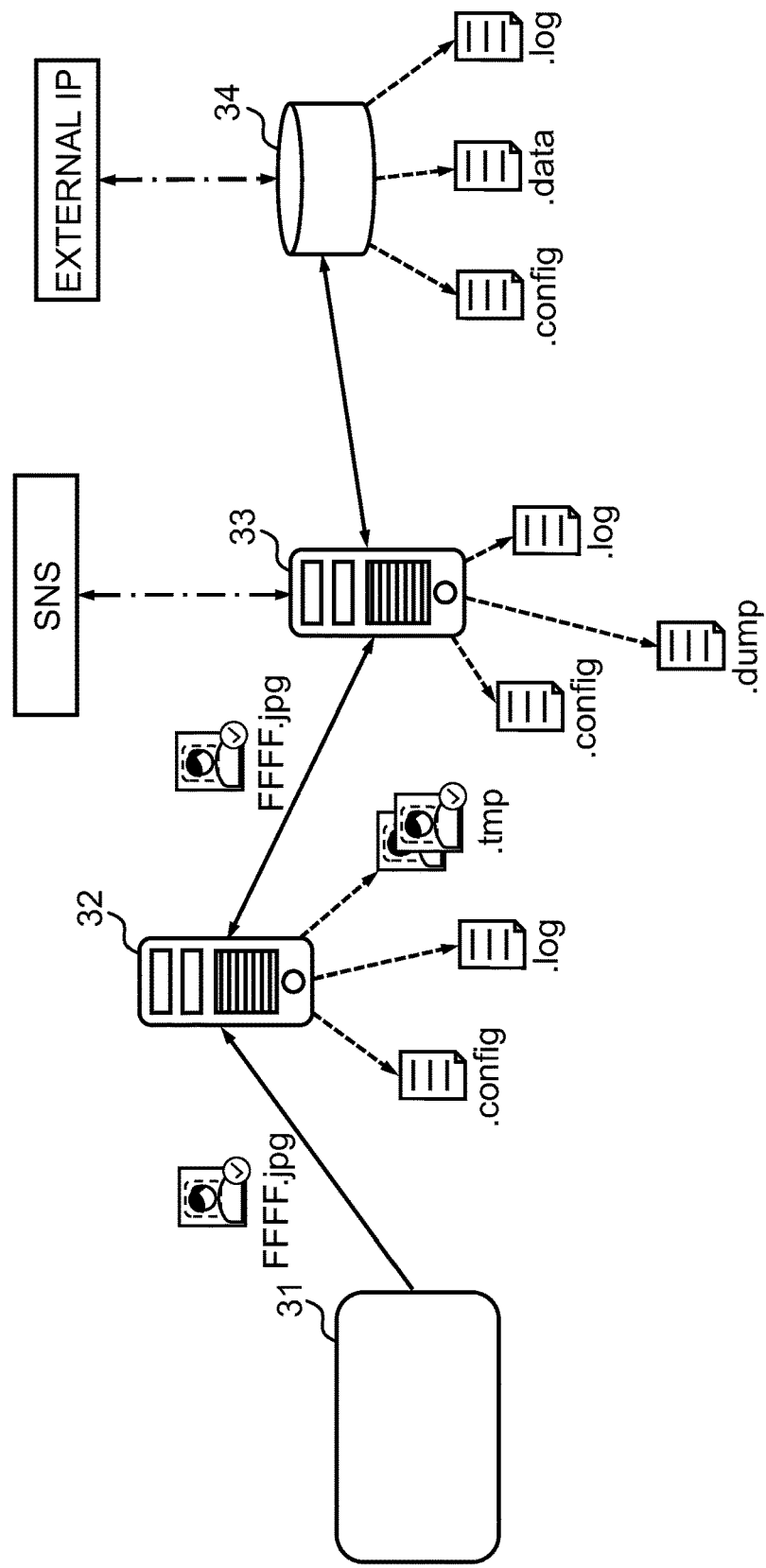
FIG. 1 is a diagram describing a data flow in a system to be analyzed according to a first example embodiment.

Hereinafter, example embodiments of the present invention are described in detail with reference to the accompanying drawings. Note that, in the Specification and drawings, elements to which similar descriptions are applicable are denoted by the same reference signs, and overlapping descriptions may hence be omitted.

Each example embodiment described below is merely an example of a configuration that can implement the present invention. Each example embodiment described below can be appropriately modified or changed according to a configuration of an apparatus to which the present invention is applied and various conditions. All of combinations of elements included in each example embodiment described below are not necessarily required to implement the present invention, and a part of the elements can be appropriately omitted. Hence, the scope of the present invention is not limited by configurations described in each example embodiment described below. Configurations in which a plurality of configurations described in the example embodiments are combined can also be adopted unless the configurations are consistent with each other.

Descriptions according to the present invention will be given in the following order.

1. Overview of Example Embodiments of Present Invention
2. First Example Embodiment
    2.1. Data Flow in System to be Analyzed
    2.2. Operational Style of Analysis System
    2.3. Hardware Configuration of Information Processing Apparatus
    2.4. Functional Configuration of Analysis Condition Generating Apparatus
    2.5. Flow in Analysis Condition Generating Processing
    2.6. Flow in Analyzing Processing
3. Modification of First Example Embodiment
    3.1. Functional Configuration of Analysis Condition Generating Apparatus
4. Second Example Embodiment
    4.1. Operational Style of Analysis System
    4.2. Functional Configuration of Analysis Condition Generating Apparatus
    4.3. Functional Configuration of Analyzing Processing Apparatus 4.4. Flow in Analyzing Processing
5. Third Example Embodiment
6. Fourth Example Embodiment
7. Other Example Embodiment 1. Overview of Example Embodiments of Present Invention Firstly, an overview of example embodiments of the present invention is described.

(1) Technical Problem

In recent years, it is preferred to enhance security for a system connected to a network, and service for analyzing security risk for the system is provided such as vulnerability assessment and penetration test.

The vulnerability assessment is a method for comprehensively understanding based on definition of known vulnerability such as a SQL injection and Cross-Site Request Forgeries, the vulnerability inherent in the system and lackness of a security function. The penetration test is a method for analyzing based on an attacking scenario prepared in advance, whether an attacking goal is achieved with attack to the system, and understanding possibility in damage to the system.

For example, a technique is disclosed for generating information to evaluate the vulnerability in a target system to be analyzed based on a standard and a specification used by the target system to be analyzed and disclosed vulnerability information.

Also, for example, a technique is disclosed for obtaining as a threat list, a list of threat with the attack to a software processing and a vulnerability description in which the processing with the vulnerability to the threat is described, and determining, from a software processing flow, a vulnerable point included in the threat list.

The vulnerability assessment can comprehensively verify entire the system, whereas it is difficult to understand undefined vulnerability. Also, the penetration test can verify a specific invasion manner to the system, whereas it involves a problem in which cost and time are increased when comprehensively analyzing the system. For such problem, a security risk analysis is performed focusing on treating data in the system to be analyzed.

In the above-mentioned technique for generating information to evaluate the vulnerability in the target system to be analyzed, the vulnerability is evaluated in the standard and specification used by the target system to be analyzed. That is, the above-mentioned technique for generating the information to evaluate the vulnerability in the target system to be analyzed is not for analyzing the security risk focusing on treating the data in the system to be analyzed, and thus, cannot evaluate the undefined vulnerability and vulnerability not in the standard and the specification used by the system to be analyzed.

Also, in the technique for determining, from the software processing flow, the vulnerable point included in the threat list, the vulnerability description included in the threat list is obtained from a CWE (Common Weakness Enumeration). For the CWE, since a wide variety of types of vulnerabilities are hierarchized and abstracted, it is necessary to embody the vulnerability for each software processing flow when determining the vulnerable point by applying to the software processing flow. Therefore, large amount of rules for embodiment are required when comprehensively analyzing the system, and so, the problem cannot be solved in which cost and time are increased.

In view of the above-mentioned context, an object of the present example embodiment is to automatically generate an analysis condition for security risk for a data flow in the system to be analyzed.

(2) Technical Feature

In the example embodiments of the present invention, an analysis condition generating apparatus includes an analysis condition generating unit configured to generate from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, and generate based on the graph structural data, an analysis condition for analyzing security risk for the system to be analyzed.

According to the present invention, the analysis condition can be automatically generated for the security risk for the data flow in the system to be analyzed. It is noted that the above-mentioned technical feature is merely a specific example of the example embodiments of the present invention, and as a matter of course, the example embodiment of the present invention is not limited to the above-mentioned technical feature.

2. First Example Embodiment

Hereinafter, with reference to FIG. 1 to FIG. 8, a first example embodiment is described according to the present invention. According to the present example embodiment, an analysis system is described including an analysis condition generating apparatus configured to analyze security risk targeted for a system that provides a service over a network for example.

<2.1. Data Flow in System to be Analyzed>

Firstly, with reference to FIG. 1, a data route in the system to be analyzed is described. FIG. 1 is a diagram describing a data route in an authentication system 3A that is an example of the system to be analyzed. The authentication system 3A corresponds to a system that provides an authentication service for authenticating a user with an existing facial authentication technique for example.

The authentication system 3A includes a user information obtaining module 31, a client server 32, a server 33 and a DB (Data Base) 34. The user information obtaining module 31, the client server 32, the server 33 and the DB 34 are interconnected over a network different from a network 7 (see FIG. 2).

As the user information obtaining module 31, an ID reader and a camera etc. can be used, the ID reader is capable of reading from an IC chip embedded in a card, user information including a user facial image, and the camera images as user information, a facial image of user who passes a gate etc. The user information obtained by the user information obtaining module 31 is transmitted to the client server 32. According to the present example embodiment, an information route for exchange in the authentication system 3A is described as an example of a route for data including the user information obtained by the user information obtaining module 31. Also, an example of data includes a "FFFF.jpg" file indicating the user facial image, and a data file with an extension such as ".config", ".log", ".tmp", ".dat" and ".dump".

It is noted in FIG. 1, data exchange between the user information obtaining module 31, the client server 32, the server 33 and the DB 34 is indicated with a solid arrow. Also, access to a file and generation of the file with a program executed in the client server 32, the server 33 and the DB 34 are indicated with a dashed arrow. Further, communication in the server 33 and the DB 34 with an IP (Internet Protocol) address external to the authentication system 3A is indicated with a dashed-and-dotted line.

The client server 32 obtains the user information (e.g., "FFFF.jpg" and a variety type of setting information on the user) read by the user information obtaining module 31. The client server 32 generates based on the obtained user information, a data file including a file identifier for uniquely identifying the data file. For example, the client server 32 generates the data file with the extension such as ".log", ".tmp" and so on. The data file with the extension ".log" corresponds to log data for the program executed in the client server 32. Also, the client server 32 generates a temporal data file with the extension ".tmp" including an image "FFFF.jpg". Further, the client server 32 reads the data file with the extension ".config". The data file with the extension ".config" corresponds to a setting file including the data for a setting parameter such as IP address of the server 33 for example, and includes the file identifier for uniquely identifying the file.

The server 33 receives the user information from the client server 32. The server 33 generates based on the received user information, the data file including the file identifier for uniquely identifying the data file. The server 33 generates the data file with the extension ".log", ".dump" and so on for example. The data file with the extension ".log" corresponds to the log data for the program executed in the server 33. Also, the server 33 generates the data file with the extension ".dump" indicating that the program executed in the server 33 fails. Further, the server 33 reads the data file with the extension ".config". The data file with the extension ".config" corresponds to the setting file including the data for the setting parameter such as IP address of the DB 34 for example, and includes the file identifier for uniquely identifying the file. Yet further, the server 33 communicates with a SNS (Social Networking Service) implemented in an information resource that is assigned with the IP address external to the authentication system 3A.

The DB 34 receives and stores the user information from the server 33. Also, the DB 34 generates based on the received user information, the data file including the file identifier for uniquely identifying the data file. The DB 34 generates the data file with the extension ".log", ".dump" and so on for example. The data file with the extension ".log" corresponds to the log data for the program executed in the DB 34. Further, the DB 34 generates the data file with the extension ".dat" including a certain type of data. Yet further, the DB 34 reads the data file with the extension ".config". The data file with the extension ".config" corresponds to the setting file including the setting parameter such as location in which the data for the DB 34 is stored for example, and includes the file identifier for uniquely identifying the file.

In this way, a wide variety of data is generated and exchanged by executing the program in the authentication system 3A. However, the data generated or exchanged with execution of the program executed in the authentication system 3A is not necessarily used for the authentication service provided by the authentication system 3A. Also, some of the data generated or exchanged in the authentication system 3A is considered to involve security risk.

For example, in the data route for exchange in the authentication system 3A, the data including personal information such as the user information may expose to the IP external to the authentication system 3A such as SNS. The situation in which the data including the personal information may expose to the IP external to the authentication system 3A is not preferred from the viewpoint of security. Also, it is not considered that it is preferred from the viewpoint of security, that data remains, for example, the temporal data file with the extension ".tmp" remains in the same directory beyond a predetermined time. Further, the data file with the extension ".dump" is a file generated for analyzing the cause if the executing program fails during the system development. Therefore, it is not considered that it is preferred from the viewpoint of security that the data file with the extension ".dump" is generated in a production environment of the authentication system 3A.

The information related to the above-mentioned data generated or exchanged with execution of the program executed in the authentication system 3A can be obtained as follows. For example, the information can be obtained by the authentication program executed in the authentication system 3A obtaining a system call invoked when using a resource for each host (storage medium, memory, and so on) and snapshotting the authentication system 3A during execution of the authentication program. The system call and snapshot of the authentication system 3A is information generated by executing the program (authentication program in this case) executed in the authentication system 3A. In other word, the system call and snapshot of the authentication system 3A correspond to historical information related to an operational history for the program executed in the authentication system 3A. Hereinafter, the system call and snapshot of the system to be analyzed such as the authentication system 3A may be referred to as "historical information".

According to the present example embodiment, an analysis apparatus 2 obtains the historical information from the authentication system 3A and generates a data flow graph representing the historical information in a graph structure. Then, the analysis apparatus 2 analyzes using the generated data flow graph, the security risk for the data route for exchange in the authentication system 3A.

<2.2. Operational Style of Analysis System>

Figure 2:
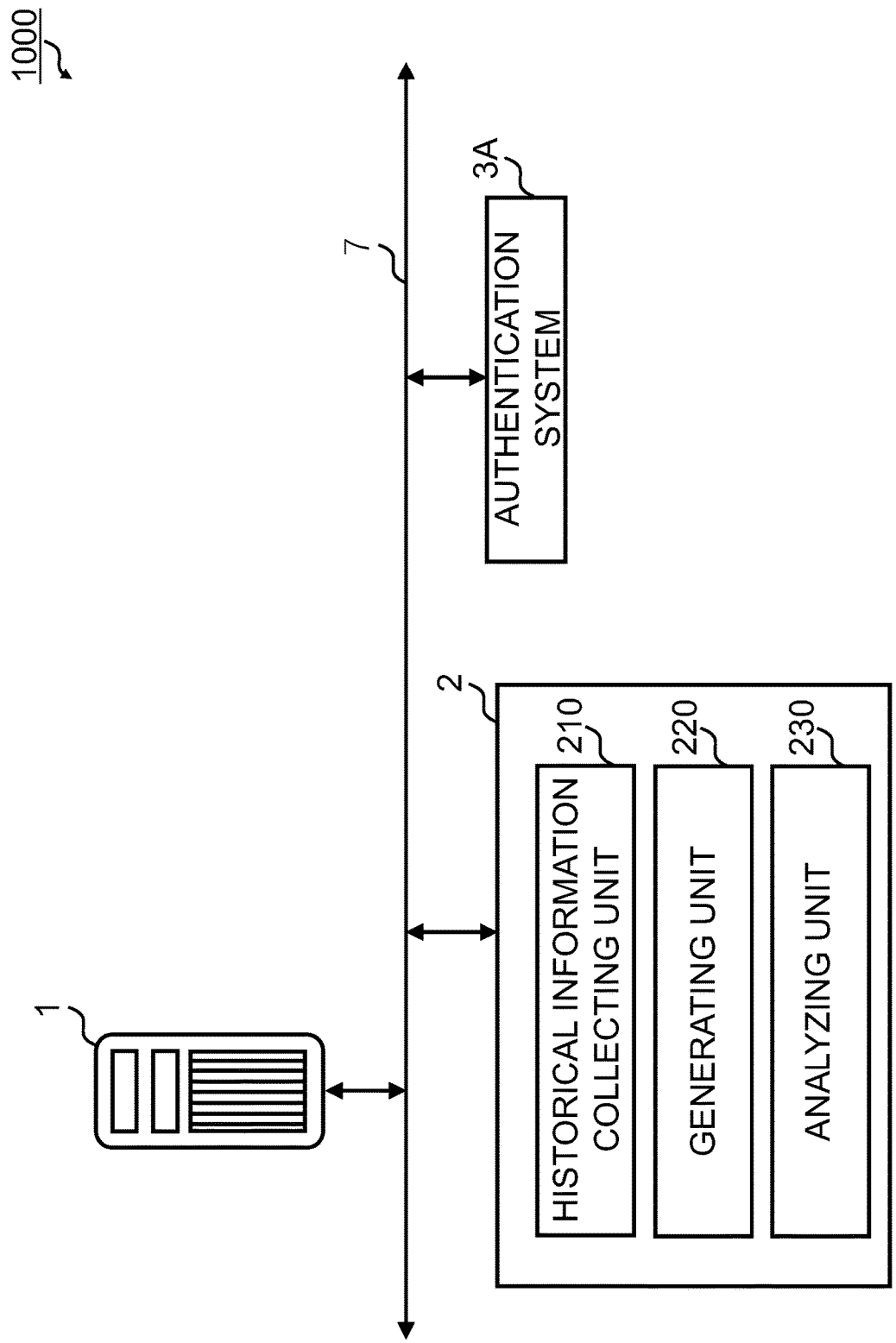
FIG. 2 is a diagram showing an operational style of an analysis system according to a modification of the first example embodiment.

Next, with reference to FIG. 2, an operational style of an analysis system 1000 is described. FIG. 2 is a diagram showing the operational style of the analysis system 1000. As shown in FIG. 2, in the analysis system 1000, an analysis condition generating apparatus 1, an analysis apparatus 2, and a host terminal included in the authentication system 3A are connected over the network 7.

The analysis condition generating apparatus 1 generates an analysis condition for analyzing whether the analysis apparatus 2 involves the security risk.

The analysis apparatus 2 obtains the historical information from the authentication system 3A and analyzes whether the data route for exchange in the authentication system 3A involves the security risk. The analysis apparatus 2 corresponds to an information processing apparatus such as a server in which the program is installed for analyzing whether the data route for exchange in the system to be analyzed involves the security risk. Also, the system to be analyzed according to the present example embodiment corresponds a system connected to the analysis apparatus 2 over the network 7 such as the authentication system 3A for example.

The analysis apparatus 2 includes a historical information collecting unit 210 configured to collect the historical information from the system to be analyzed, a generating unit 220 configured to generate based on the historical information, the data flow graph indicating the data route for exchange in the system to be analyzed, and an analyzing unit 230 configured to perform an analyzing processing for analyzing based on the analysis condition, whether the data flow graph involves the security risk.

The authentication system 3A includes as the host terminal, the user information obtaining module 31, the client server 32, the server 33, and the DB 34.

<2.3. Hardware Configuration of Information Processing Apparatus>

Figure 3:
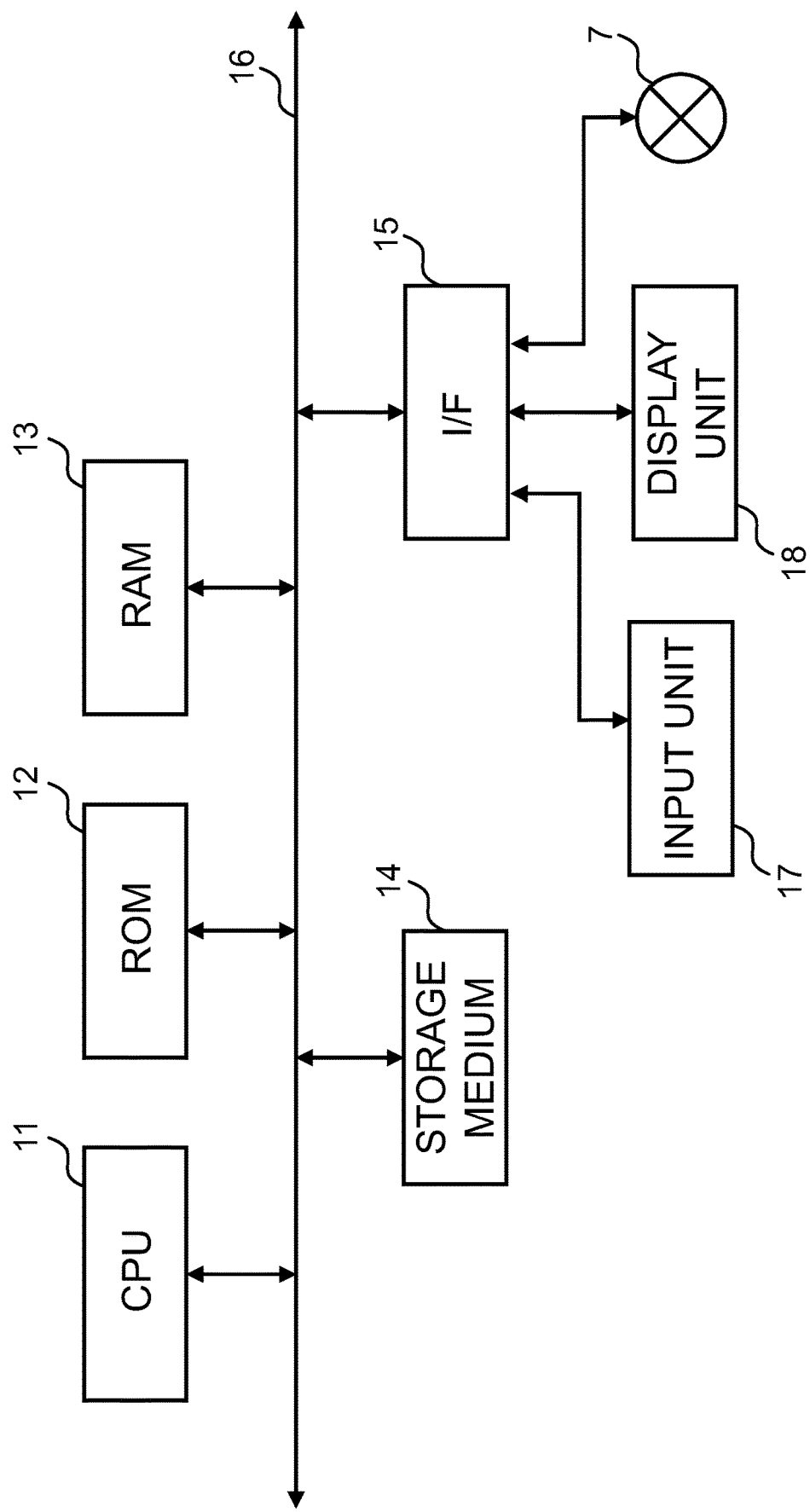
FIG. 3 is a block diagram showing a hardware configuration of an analysis condition generating apparatus according to the first example embodiment.

Next, with reference to FIG. 3, a hardware configuration of an information processing apparatus is described such as the analysis condition generating apparatus 1, the analysis apparatus 2, and the host terminal included in the authentication system 3A according to the present example embodiment. FIG. 3 is a block diagram showing the hardware configuration of the information processing apparatus.

The information processing apparatus includes a CPU (Central Processing Unit) 11, a ROM (Read Only Memory) 12, a RAM (Random Access Memory) 13, a storage medium 14, and an interface (I/F) 15 that are interconnected via a bus 16. Also, an input unit 17, a display unit 18, and a network 7 are connected to the I/F 15.

The CPU 11 is a calculating means and controls an entire operation of the information processing apparatus. The ROM 12 is a read only non-volatile storage medium and stores program such as firmware. The RAM 13 is a volatile storage medium on which the data can be read and written at high speed, and is used as a working area when the CPU 11 processes the information. The storage medium 14 is a non-volatile storage medium on which the information can be read and written, such as an HDD (Hard Disk Drive) and stores OS (Operating System), a variety of control program, application and program, and so.

The I/F 15 connects the bus 16 to a variety of hardware and network, and controls them. The input unit 17 is an input apparatus for the user to input the information in the information processing apparatus, such as a keyboard and a mouse. The display unit 18 is a display apparatus for the user to confirm the status of the information processing apparatus, such as an LCD (Liquid Crystal Display). It is noted that the input unit 17 and the display unit 18 can be omitted.

In this hardware configuration, a software controlling unit is configured in the information processing apparatus by the CPU 11 performing the calculation according to the program stored on the ROM 12 and the program loaded from the storage medium 14 to the RAM 13. Then, a functional block is configured for implementing a function of a controller 100 (see FIG. 4) in the analysis condition generating apparatus 1 according to the present example embodiment by a combination of the configured software controlling unit and the hardware. Also, a function of the historical information collecting unit 210, the generating unit 220, and the analyzing unit 230 is implemented in the analysis apparatus 2 by the combination of the software controlling unit and the hardware included in the analysis apparatus 2, the software controlling unit is configured by the CPU 11 of the analysis apparatus 2 performing the calculation according to the program stored on the ROM 12 of the analysis apparatus 2 and the program loaded from the storage medium 14 of the analysis apparatus 2 to the RAM 13 of the analysis apparatus 2.

<2.4. Functional Configuration of Analysis Condition Generating Apparatus>

Figure 4:
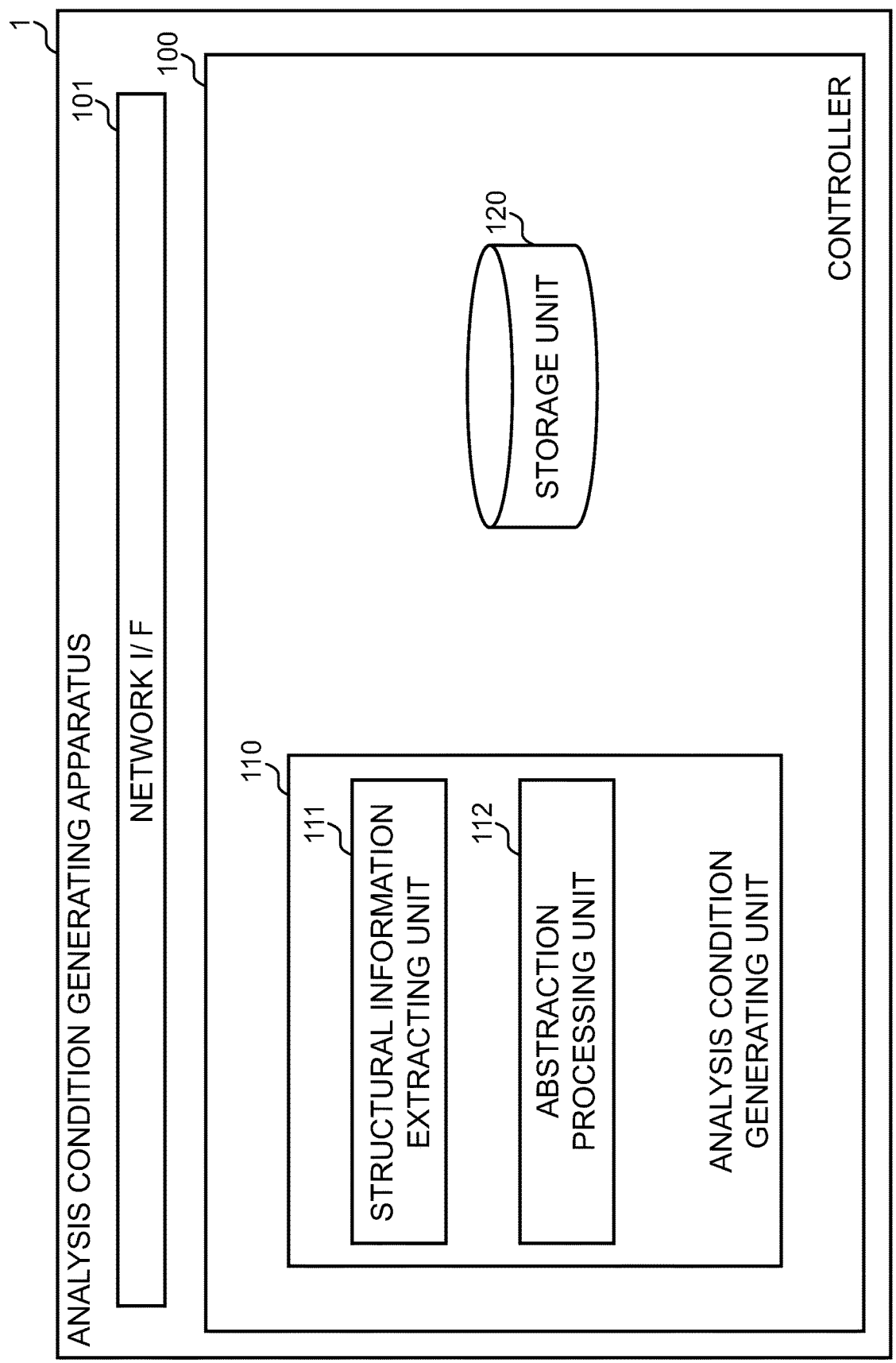
FIG. 4 is a functional block diagram showing a functional configuration of the analysis condition generating apparatus according to the first example embodiment.

Next, with reference to FIG. 4, a functional configuration of the analysis condition generating apparatus 1 is described. FIG. 4 is a functional block diagram showing the functional configuration of the analysis condition generating apparatus 1. As shown in FIG. 4, the analysis condition generating apparatus 1 includes a controller 100 for controlling an entire operation of the analysis condition generating apparatus 1 and a network IN 101 for inputting and outputting the information to the controller 100.

The controller 100 generates based on the information obtained via the network OF 101, an analysis condition for analyzing the security risk for the authentication system 3A for example. The controller 100 is configured by installing a dedicated software program in the information processing apparatus such as the analysis condition generating apparatus 1 for example.

As shown in FIG. 4, the controller 100 includes an analysis condition generating unit 110 and a storage unit 120. The analysis condition generating unit 110 generates from the information indicating the security risk for the information security such as common vulnerability identifier (Common Vulnerability and Exposures: CVE) and common vulnerability type list (Common Weakness Enumeration: CWE), the analysis condition for analyzing the security risk. The CVE refers to listed vulnerability information to which a unique identification number is allocated for the purpose of comparing easily the vulnerability information among vendors. Also, the CWE refers to an index for classifying the vulnerability to which area, and corresponds to the supplementary information on the CVE. Hereinafter in the description, character information is referred to as "vulnerability information" indicating the security risk for the information security such as CVE, CWE, AAR (After Action Report), and analysis report for the security risk prepared by security vendor and specialist.

Specifically, the analysis condition generating unit 110 generates the analysis condition by performing a natural language processing for the vulnerability information. The natural language processing performed by the analysis condition generating unit 110 includes a named entity recognition process, a relation extraction process, a normalization process, and a Template Filling process.

The named entity recognition (Named Entity Recognition: NER) process is a process for recognizing (extracting) a named entity from a natural sentence. The natural sentence refers to the character information used by human in daily life, such as spoken language and written language, and refers to the unstructured character information on example, the CVE and the CWE is an example of the character information indicating the security risk for the information security.

The relation extraction (Relation Extraction: RE) process is a process for extracting a relation between the named entities recognized in the NER process. The normalization process is a process for removing a noise included in the named entity by performing a processing such as division of word, and correction of letter type, spelling and variation in notation. The Template Filling process is a process for applying the named entity and the relation between the named entities to a structure described in a template. The analysis condition generating unit 110 according to the present example embodiment performs the natural language processing using ontology as the template. The detail of the analysis condition generating processing performed in the analysis condition generating unit 110 and the ontology is described below.

The analysis condition generating unit 110 includes a structural information extracting unit 111 and an abstraction processing unit 112. The structural information extracting unit 111 performs a structuring processing for extracting from the natural sentence such as vulnerability information, graph structural data in which the named entity is structured in graph. The abstraction processing unit 112 performs an abstracting processing for transforming into the abstract representation, the named entity included in the graph structural data. The detail of the structuring processing and the abstracting processing is described below.

The storage unit 120 is a storage area for storing the vulnerability information and the ontology etc. According to the above-described configuration, the condition generating apparatus 1 generates the analysis condition for analyzing the security risk for the system to be analyzed.

According to the present example embodiment, the analysis apparatus 2 analyzes the security risk for the data flow graph indicating the data flow in the system to be analyzed. The data flow graph corresponds to historical information of the system to be analyzed, the historical information is structured in graph with a node representing a data entity and an edge representing an event related to the node. Accordingly, the analysis condition for analyzing the security risk for the data flow graph also should be the information structured in graph, a search formula of query language (Gremlin (registered trademark), Cypher (registered trademark), and SPARQL) for the graph, or program for implementing the graph query and so.

Also, it is possible to analyze the security risk for the data flow graph by automatically generating the analysis condition from the threat information defined in OpenloC (Indicator of Compromise), STIX (Structured Threat Information eXpression) and so on. However, since the OpenloC and the STIX are the information in which the known vulnerability and threat are defined, it can only analyze those exposing to the vulnerability and threat for which the system to be analyzed is defined in the OpenloC and the STIX. That is, it cannot evaluate the security risk varying from the known vulnerability and threat.

For such problem, according to the present example embodiment, an abstract structure according to a rule for the data flow in the system to be analyzed is extracted as the graph structural data from the natural sentence indicating the known vulnerability and threat, and the analysis condition is generated that can analyze the security risk varying from the known vulnerability and threat.

<2.5. Flow in Analyzing Processing>

Figure 5B:
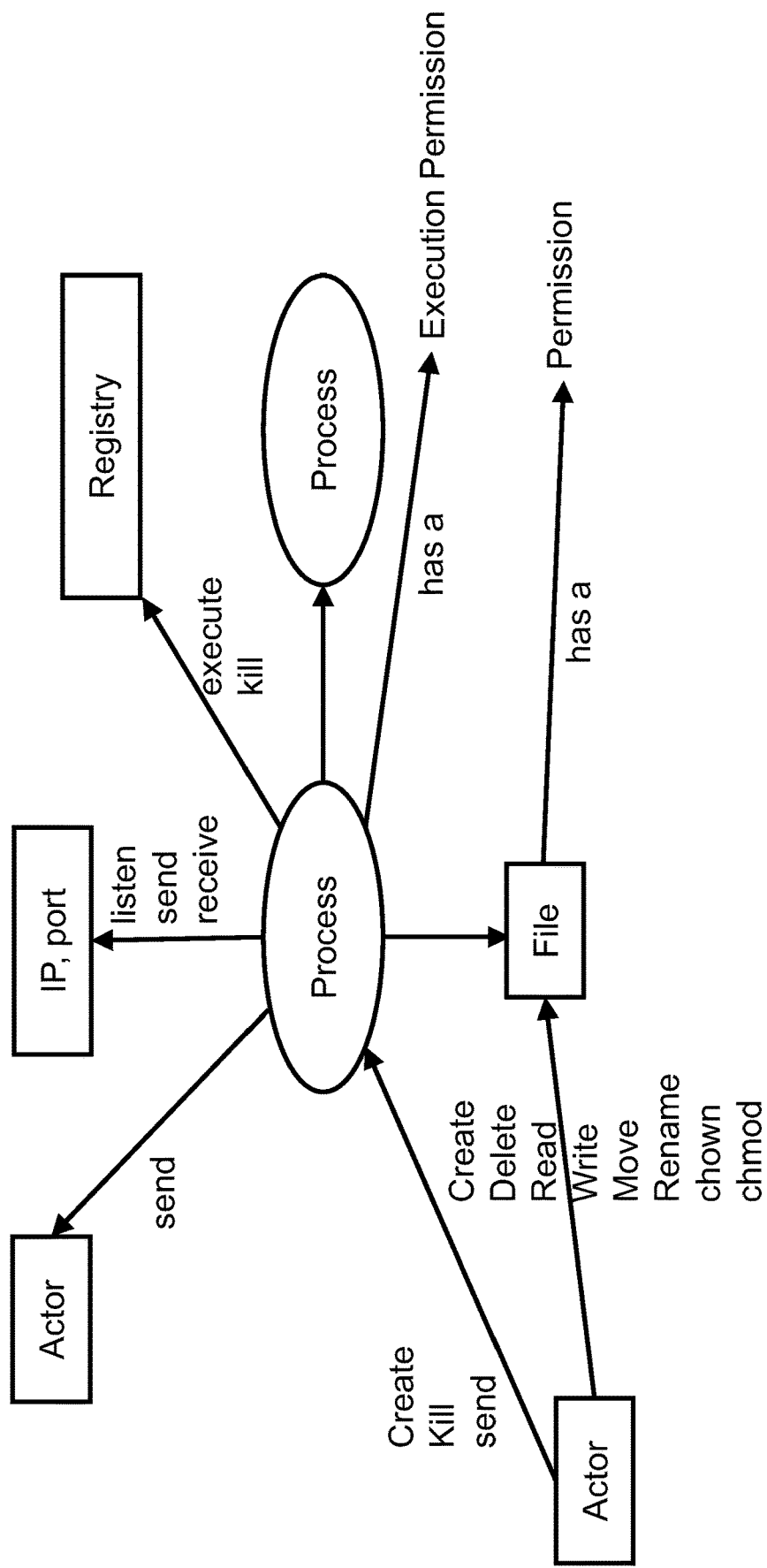
FIG. 5B is a diagram illustrating the ontology according to the first example embodiment.
Figure 6:
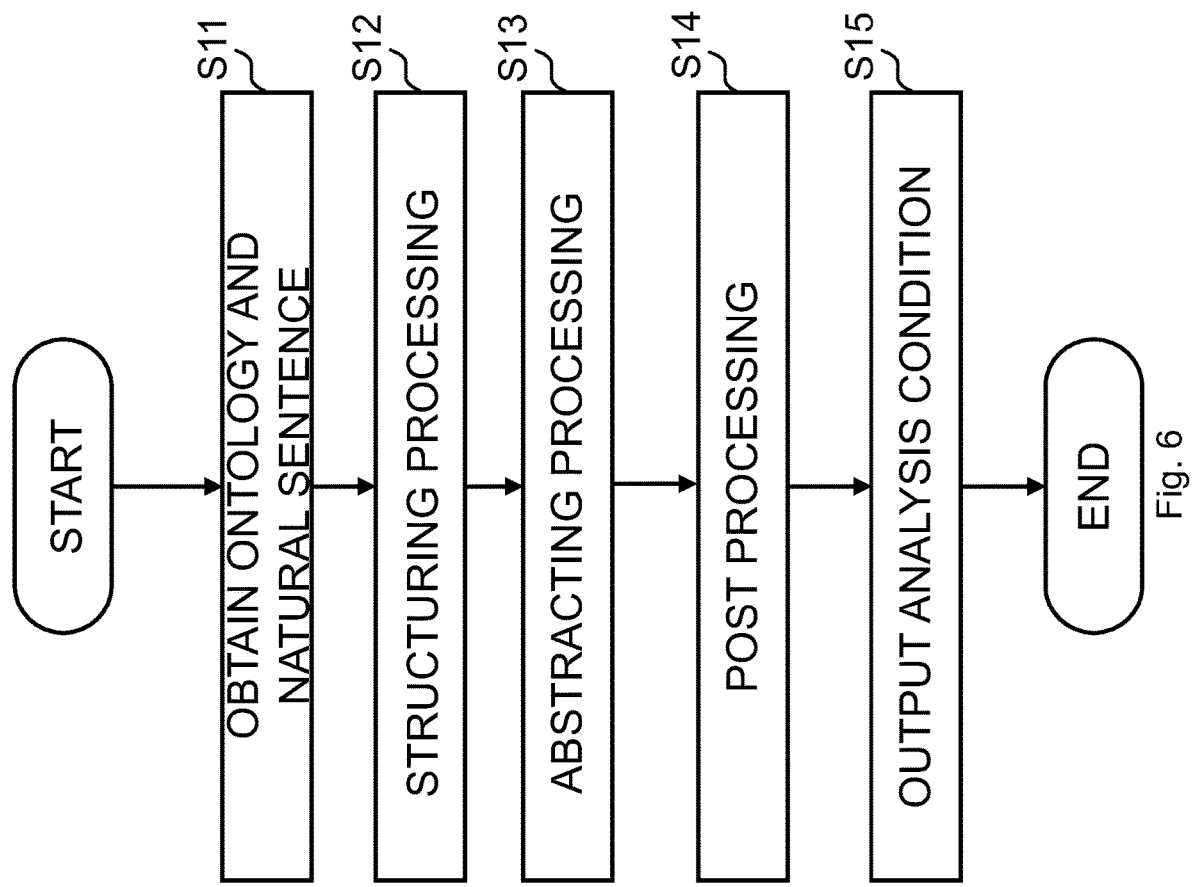
FIG. 6 is a flowchart showing a flow in an analysis condition generating processing according to the first example embodiment.
Figure 7B:
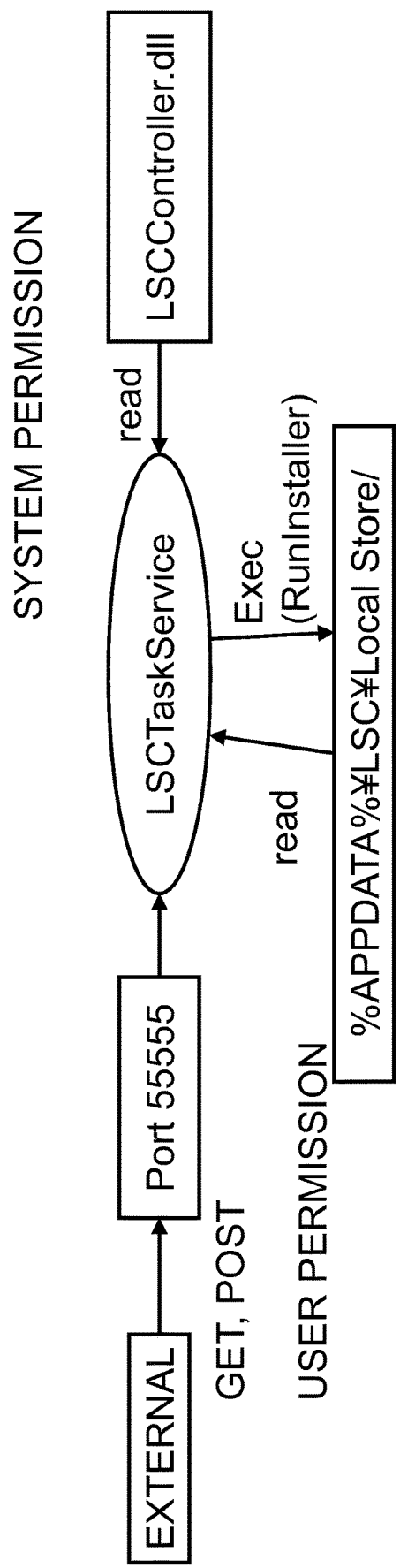
FIG. 7B is a diagram illustrating a structuring processing according to the first example embodiment.
Figure 8:
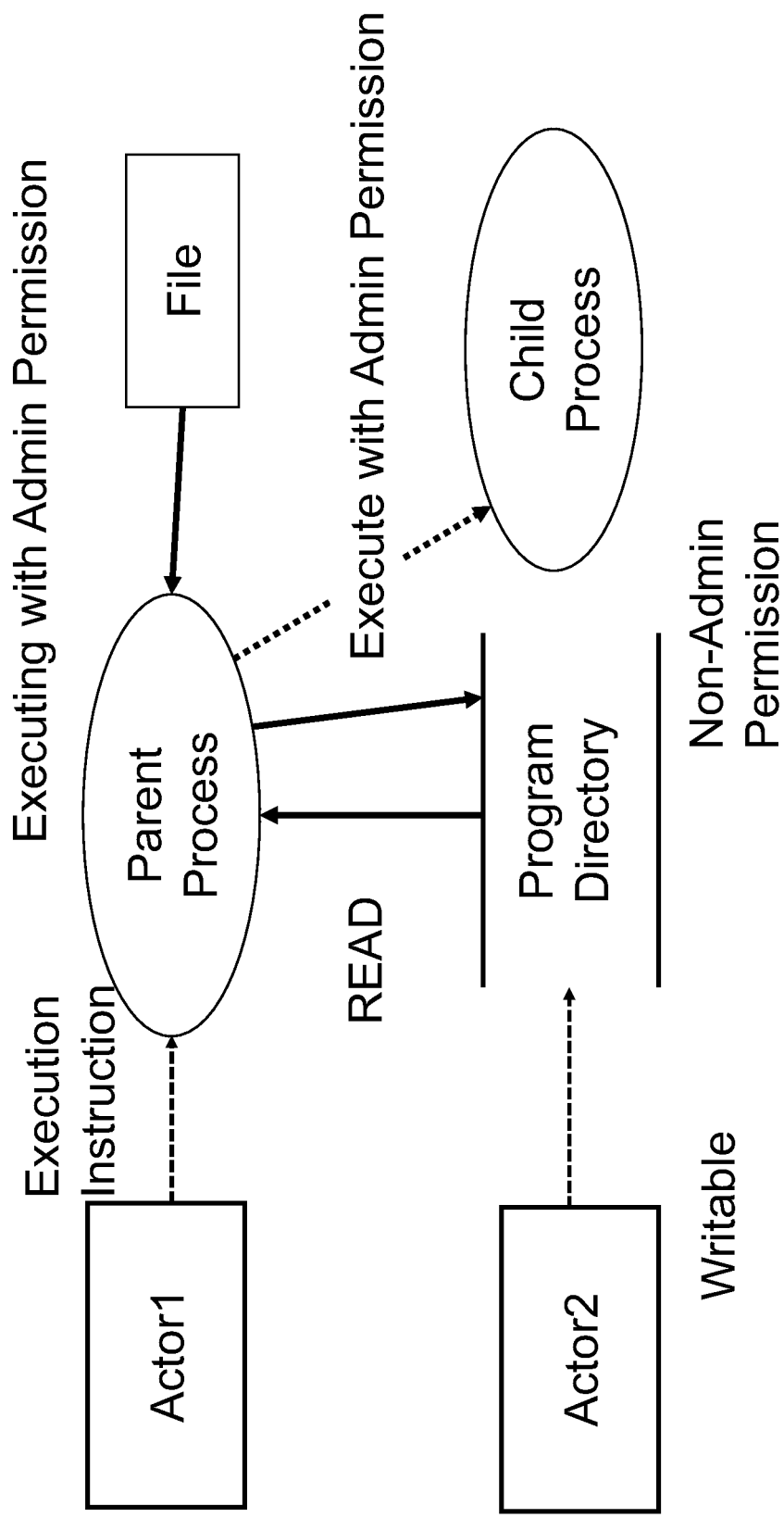
FIG. 8 is a diagram illustrating an abstracting processing according to the first example embodiment.

Next, with reference to FIG. 5A to FIG. 8, the detail of the analysis condition generating processing for generating the analysis condition for analyzing the security risk is described. FIG. 5A is a diagram illustrating a description of ontology according to the present example embodiment. FIG. 5B is a diagram illustrating the ontology according to the present example embodiment. FIG. 6 is a flowchart showing a flow in the analysis condition generating processing according to the present example embodiment. FIG. 7A is a diagram showing an example of the natural sentence according to the present example embodiment. FIG. 7B is a diagram illustrating the structuring processing according to the present example embodiment. FIG. 8 is a diagram illustrating the abstracting processing according to the present example embodiment.

Firstly, the ontology is described according to the present example embodiment. The "ontology" refers to the definition in which a vocabulary, a semantics of the vocabulary, and a relationship between a word and the semantics that are used when describing certain knowledge are expressly defined as s specification to allow for sharing with other computer by describing a relation between concepts using a semantic link.

For example, it is considered for the ontology in which the relationship between three vocabularies "creature", "rabbit" and "long ear" is described. Firstly, it is considered for the relationship between "rabbit" and "creature". 'The "rabbit" should necessarily be the "creature"' whereas 'the "creature" should not necessarily be the "rabbit"'. In this case, in the ontology, the relationship in which the "rabbit" is the "creature" is described "(rabbit)—(is a)→(creature)" using the semantic link like (is a) link. The "rabbit" that is at a start point of arrow in the (is a) link is a lower concept, and the "creature" that is at an end point of arrow is a upper concept. When describing the relationship between two concepts using the (is a) link, the lower concept inherits an attribute from the upper concept unless an exception is specified.

Next, it is considered for the relationship between the "rabbit" and the "long ear". In this case, each human considers the difference in the relationship between the "rabbit" and the "long ear", for example, each human considers that 'the "rabbit" grows the "long ear"', 'the "rabbit" has the "long ear"', and 'the "long ear" of the "rabbit" drops'. As stated above, the ontology refers to the definition in which the relation between the concepts is expressly defined as the specification using the semantic link. In order for the computer to expressly interpret 'the "rabbit" has the "long ear"' as the relationship between "rabbit" and the "long ear", the relationship is described "(rabbit)—(has a)→(long ear)" using the semantic link like (has a) link in the ontology. By describing the ontology in this way, every computer can interpret that the relationship between "rabbit" and the "long ear" corresponds to that 'the "rabbit" has the "long ear"'.

Also, the (has a) link is the semantic link indicating the relation between a whole and a part. Accordingly, when describing the relationship between two concepts using the (has a) link, the lower concept does not necessarily inherit the attribute from the upper concept unlike the (is a) link. That is, the relation in which 'the "rabbit" should necessarily be the "long ear"' is established whereas the relation in which 'one having the "long ear" is the "rabbit"' is not necessarily established. It is noted that there is a (part of) link as the semantic link indicating the relation between the whole and the part other than the (has a) link.

In this way, the ontology corresponds to the information in which a node representing the upper concept and a node representing the lower concept are structured in graph by linking therebetween with an edge representing an event related to the nodes representing the upper concept and the lower concept using a vocabulary by natural language indicating the concept or a simple predicate indicating an event between the concepts such as "is a" and "has a", and in which the relationship between the nodes is described in a format that the computer can interpret.

Next, with reference to FIG. 5A and FIG. 5B, an example of constructing the ontology is described. FIG. 5A illustrates examples "(Process)—(execute)→(Process)", "(Process)—(read/write)→(File)", "(Process)—(has a)→(execution permission)", "(File)—(has a)→(permission), . . . as the information described in the ontology.

The ontology is constructed by an operator operating the analysis condition generating apparatus 1 according to the present example embodiment. The operator operating the analysis condition generating apparatus 1 constructs based on a data flow graph indicating a data flow in the system to be analyzed (e.g., authentication system 3A), the ontology used when generating the analysis condition for example.

It is noted that the operator operating the analysis condition generating apparatus 1 may construct the ontology by referring the vulnerability information may include the information not included in the data flow graph obtained from the system to be analyzed. For example, the information that is not included in the data flow graph obtained from the system to be analyzed may be included in the vulnerability information. It is assumed that the vulnerability information includes the description "setting file XX including a password read by a process AA", and the data flow graph obtained from the system to be analyzed includes the information on "the file XX read by the process AA".

In this case, the operator operating the analysis condition generating apparatus 1 may generate the ontology as the attribute of node indicating the "file XX" with addition of "being setting file" and "including the password". In this case, the ontology is described "(config file)—(is a)→(File)—(has a)→(password)" for example.

The description "(Process)—(execute)→(Process)" is the description indicating that one process executes another process. Also, the description "(Process)—(read/write)→(File)" is the description indicating that one process reads/writes one file. Further, the description "(Process)—(has a)→(execution permission)" is the description indicating that one process has an attribute indicating the execution permission. Yet further, the description "(File)—(has a)→(access permission)" is the description indicating that one file has an attribute indicating the access permission.

FIG. 5B is a diagram illustrating the description of the ontology in 5A in a graph structure. As shown in FIG. 5B, the description of the ontology can be represented as graph structural data in which the node representing the upper concept and the node representing the lower concept are linked with the edge representing the event related to the nodes representing the upper concept and the lower concept.

For example, the description ("(Process)—(execute)→(Process)": FIG. 5A) representing the relationship in which one process executes another process can be represented as the graph structural data in which the start point of arrow "(Process)" represents the lower concept, the "(execute)" represents the edge, and the end point of arrow "(Process)" represents the upper concept.

As shown in FIG. 5A and FIG. 5B, the ontology has an abstraction identifier indicating a type of node and a type of edge. The abstraction identifier indicating the type of node includes "(Process)", "(Registry)", "(File)", "(IP Port)", and "(Actor)" for example.

The "(Process)" is the abstraction identifier of node indicating the process based on file information of header portion and a predetermined extension (e.g., file with an extension ".exe"). Also, each of the "(Registry)" and the "(File)" is the abstraction identifier of node indicating the information on setting OS and the information on storing a document file, that is, a data store. Further, the "(IP Port)" is the abstraction identifier of node indicating a communication socket such as an IP address and a port number.

Yet further, the "(Actor)" is the abstraction identifier of node indicating an outer actor that is an element other than the process, data store and communication socket among the nodes defined by the operator operating the analysis condition generating apparatus 1. The operator operating the analysis condition generating apparatus 1 may define as the node an outer attacker appeared in the CWE and the CVE, and describe in the ontology the relation with nodes indicating the above-mentioned process, data store, and communication socket. In this case, the relation between the node indicating the outer attacker and the nodes indicating the process, data store, and communication socket is represented as an edge.

In this way, according to the present example embodiment, the ontology used for generating the analysis condition corresponds to the graph structural data in which the concept of node and edge is abstracted to an extent that the type of node can be identified to be which element other than the process, data store and communication socket, and the node and edge do not include the named entity. According to the present example embodiment, the state in which the concept of node and edge is abstracted to the extent that the node and edge do not include the named entity corresponds to the state in which the node such as "xxx¥cmd.exe" and "yyy¥Explorer.exe" becomes the node not including a unique string such as "xxx¥cmd" and "yyy¥Explorer". The string such as "xxx¥cmd" and "yyy¥Explorer" corresponds to a unique identifier that is specific to each node that can uniquely identify each node.

Accordingly, according to the present example embodiment, the graph structural data can be extracted applied to the relation between the concepts defined in the ontology by using the ontology in which the concept of node and edge is abstracted to the extent not including the named entity, and by performing the natural language processing for the natural sentence. It is noted that the operator for the analysis condition generating apparatus 1 can set what extent the concept of node and edge is abstracted when constructing the ontology as desired.

Also, the node representing the process may be given the attribute indicating the execution permission for the process when constructing the ontology used for generating the analysis condition. For example, the description "(Process)—(has a)→(execution permission)" is the description indicating that the process of the node at the start point of arrow has the attribute indicating the execution permission (see FIG. 5A). That is, the node having the "(Process)" as the abstraction identifier is given the execution permission for the process by performing the natural language processing for the natural sentence using this ontology.

Further, the node representing the data store may be given the attribute indicating the access permission to the data stored on the data store when constructing the ontology used for generating the analysis condition. For example, the description "(File)-(has a)→ (access permission)" is the description indicating the relationship in which one file has the attribute indicating the access permission (see FIG. 5A). That is, the node having the "(File)" as the abstraction identifier is given the access permission for the process by performing the natural language processing for the natural sentence using this ontology.

In addition to the above, the ontology may be constructed using the (is a) link and the (has a) link, that includes the attribute indicating that the node having the abstraction identifier of "(File)" is the setting file, the attribute indicating the password, the attribute indicating the binary file, the attribute indicating the temporary file, or the attribute indicating the serialized program information.

Next, with reference to FIG. 6, a flow in the analysis condition generating processing is described according to the present example embodiment. The analysis condition generating apparatus 1 according to the present example embodiment extracts the graph structural data applied to the relation between the concepts defined in the ontology and generates the analysis condition for analyzing the security risk by performing the natural language processing for the vulnerability information using the ontology.

Firstly, in the step S11, the analysis condition generating unit 110 obtains the ontology and the natural sentence stored on the storage unit 120. FIG. 7A shows as an example of the natural sentence input to the analysis condition generating unit 110, JVNDB-2015-0061XX defined in the JVN (Japan vulnerability Notes) that is a kind of CWE.

In the natural sentence in FIG. 7A, as shown in (1) to (6), "there are a plurality of vulnerabilities in the XXXX Solution Center and the character information is included indicating that any code can be executed with 'SYSTEM permission' by the attacker".

(1) The process "LSCTaskService" is generated executing with the "SYSTEM permission" upon starting in the XXXX Solution Center (2) The process "LSCTaskService" implements the execution of method in the "LSCController.dll" module with the "GET REQUEST" and the "POST REQUEST" by executing the "HTTP daemon" using the "55555 port number"

(3) A large number of unsafety methods are included in the "LSCController.dll"

(4) The "RunInstaller" among them is designed to execute any code on the "% APPDATA %¥LSCYLocal Store" directory (5) Since the "% APPDATA % LSCLocal Store" directory is created for all user that is able to log in the system, the user can write in the directory without the administrative permission (6) General user can execute any code with "SYSTEM permission" by misusing the vulnerability.

In the step S12, the structural information extracting unit 111 performs the structuring processing based on the ontology and the natural sentence input to the analysis condition generating unit 110. Specifically, the structural information extracting unit 111 extracts from the natural sentence as shown in FIG. 7A, the graph structural data applied to the relation between the concepts defined in the ontology. FIG. 7B shows an example of the graph structural data extracted by the structuring processing from the natural sentence as shown in FIG. 7A.

As stated above, the operator for the analysis condition generating apparatus 1 can randomly set the concept of node and edge is abstracted to what extent in constructing the ontology. FIG. 7B illustrates a graph structural data that is extracted with the structuring processing from the natural sentence shown in FIG. 7A in the case of using the ontology in which the concept of node and edge is abstracted to the extent that the type of node can be identified to be which element other than the process, data store and communication socket, and the node and edge do not include the named entity. With the structuring processing, the graph structural data (see FIG. 7B) indicating the security risk as shown in the above-mentioned (1) to (6) is extracted from the natural sentence shown in FIG. 7A.

Next, in step S13, the abstraction processing unit 112 performs an abstracting processing for abstracting the named entity included in the graph structural data that is extracted by the structural information extracting unit 111.

FIG. 8 shows the graph structural data that for which the abstraction processing unit 112 performs the abstracting processing for the graph structural data shown in FIG. 7B to abstract the natural sentences in (1) to (6) in FIG. 7A to the sentences (1α) to (6α) respectively.

(1α) Upon starting XXXX Solution Center, a process "Parent Process" running with "Admin permission" is created (2α) The process "Parent Process" implements the execution of a method in "File" module with an execution instruction from "Actor 1"

(3a) The method is included in "File"

(4α) The process "Parent Process" is designed to execute any code in "Program Directory" by executing the method in the "File" module (5α) Since an access permission to the "Program Directory" is "Non-Admin permission", "Actor 2" without the administrative permission to the system can also write to this directory (6α) The "Actor 1" without the administrative permission to the system also executes any code with the "Admin permission" by misusing the vulnerability.

Specifically, the abstraction processing unit 112 transforms into an abstraction identifier, a unique identifier for the node and the edge included in the graph structural data. The abstraction processing unit 112 transforms into the abstraction identifier, the unique identifier for the node and the edge depending on the type of node and the type of edge for example. The abstraction processing unit 112 abstracts the concept of node and edge included in the graph structural data to the extent that the type of node can be identified to be which element other than the process, data store and communication socket, and the node and edge do not include the named entity. Further, the abstraction processing unit 112 performs the abstracting processing in a way in which each of a plurality of nodes can be identified if the plurality of nodes with the same type are included when abstracting them.

For example, it is assumed that the graph structural data includes a node with the type of node being the process and with the unique identifier "AYj3A", a node with the type of node being the file and with the unique identifier "xni4G", and a node with the type of node being the directory and with the unique identifier "BNWjf". The abstraction processing unit 112 identifies the type of each node based on the extension and header information of the node, and transforms the unique identifier "AYj3A" into the abstraction identifier "Process", the unique identifier "xni4G" into the abstraction identifier "File" and the unique identifier "BNWjf" into the abstraction identifier "Directory". It is noted that if the graph structural data includes the plurality of nodes with the same type of node, the abstraction processing unit 112 may abstract each of the plurality of nodes to the abstraction identifier "Process 1" and the abstraction identifier "Process 2" for example in the way in which each of the plurality of nodes can be identified. FIG. 8 illustrates a result that the abstraction processing unit 112 performs the abstracting processing to transform into the abstraction identifier "Parent Process", the unique identifier for the node of lower concept process, and transform into the abstraction identifier "Parent Process", the unique identifier for the node of upper concept process.

Also, it is assumed that the graph structural data includes a node with the type of node being the file and with the unique identifier "Tanaka" indicating a file owner, and a node with the type of node being the process and with the unique identifier "Yamada" indicating an executer of process. The abstraction processing unit 112 transforms the unique identifier "Tanaka" into the abstraction identifier "Admin" indicating the administrator and transforms the unique identifier "Yamada" into the abstraction identifier "Non-Admin" indicating the non-administrator. It is noted that if the graph structural data includes a plurality of nodes with the unique identifier indicating the user, the abstraction processing unit 112 may abstract each of the plurality of nodes to the abstraction identifier "Admin1" and the abstraction identifier "Admin2" for example in the way in which each of the plurality of nodes can be identified.

Further, it is assumed that the graph structural data includes a node with the type of node being the communication socket and with the unique identifier "8.8.8.8" indicating an IP address. The abstraction processing unit 112 abstracts, based on the IP address included in the node of communication socket, the unique identifier "8.8.8.8" indicating the IP address to the "Global IP" (or "Local IP") for example. It is noted that if the graph structural data includes a plurality of nodes with type of node being the communication socket and with the unique identifier indicating the IP address, the abstraction processing unit 112 may abstract each of the plurality of nodes to "Local IP 1" and "Local IP 2" for example in the way in which each of the plurality of nodes can be identified to distinguish each IP address.

Yet further, it is assumed that the graph structural data includes a node with the type of node being the communication socket and with the unique identifier "647X" indicating a port number. The abstraction processing unit 112 abstracts to the abstraction identifier "****" indicating any port number, the unique identifier "647X" indicating the port number included in the node of communication socket. It is noted that the abstraction processing unit 112 may perform the abstracting processing with specific numeric value remained for the port with the numbers 0 to 1023 reserved for using the well-known service and protocol (i.e. well-known-port) among the port number for TCP (Transmission Control Protocol) and UDP (User Datagram Protocol).

In this way, the graph structural data abstracted by the abstraction processing unit 112 corresponds to the graph structural data less abstracted than the ontology input in step S11, and more abstracted than the graph structural data extracted in step S12.

Return to FIG. 6, it continues to describe from step S14. The analysis condition generating unit 110 performs a post processing for the graph structural data. The analysis condition generating unit 110 performs as the post processing, a processing for editing the abstracted graph structural data according to a rule preset by the operator for the analysis condition generating apparatus 1, and for managing non-significant graph structural data distinguished from the graph structural data used for analyzing the security risk when analyzing the security risk for the system to be analyzed for example. It is noted that step S14 can be omitted.

For example, the analysis condition generating unit 110 may perform the post processing in step S14 for the graph structural data abstracted in step S13 to output as the analysis condition, the graph structural data in a form of DOT language and JavaScript (registered trademark) Object Notation (JSON) consisting of the node and edge. Also, the analysis condition generating unit 110 may output the analysis condition in a form of graph search language. In this case, the analysis condition generating unit 110 preforms the post processing for representing the graph structural data abstracted in step S13 with the search language such as Cypher and Gremlin. Since the search language such as Cypher and Gremlin is in a text form, the operator for the analysis condition generating apparatus 1 can edit using an editor. Also, the operator for the analysis condition generating apparatus 1 may intuitively edit and modify by creating the editor for visualize as the graph, the data represented with the search language such as Cypher and Gremlin.

Next, the analysis condition generating unit 110 outputs as the analysis condition used for analyzing the security risk, the graph structural data after the post processing in step S14.

<2.6. Flow in Analyzing Processing>

Figure 9:
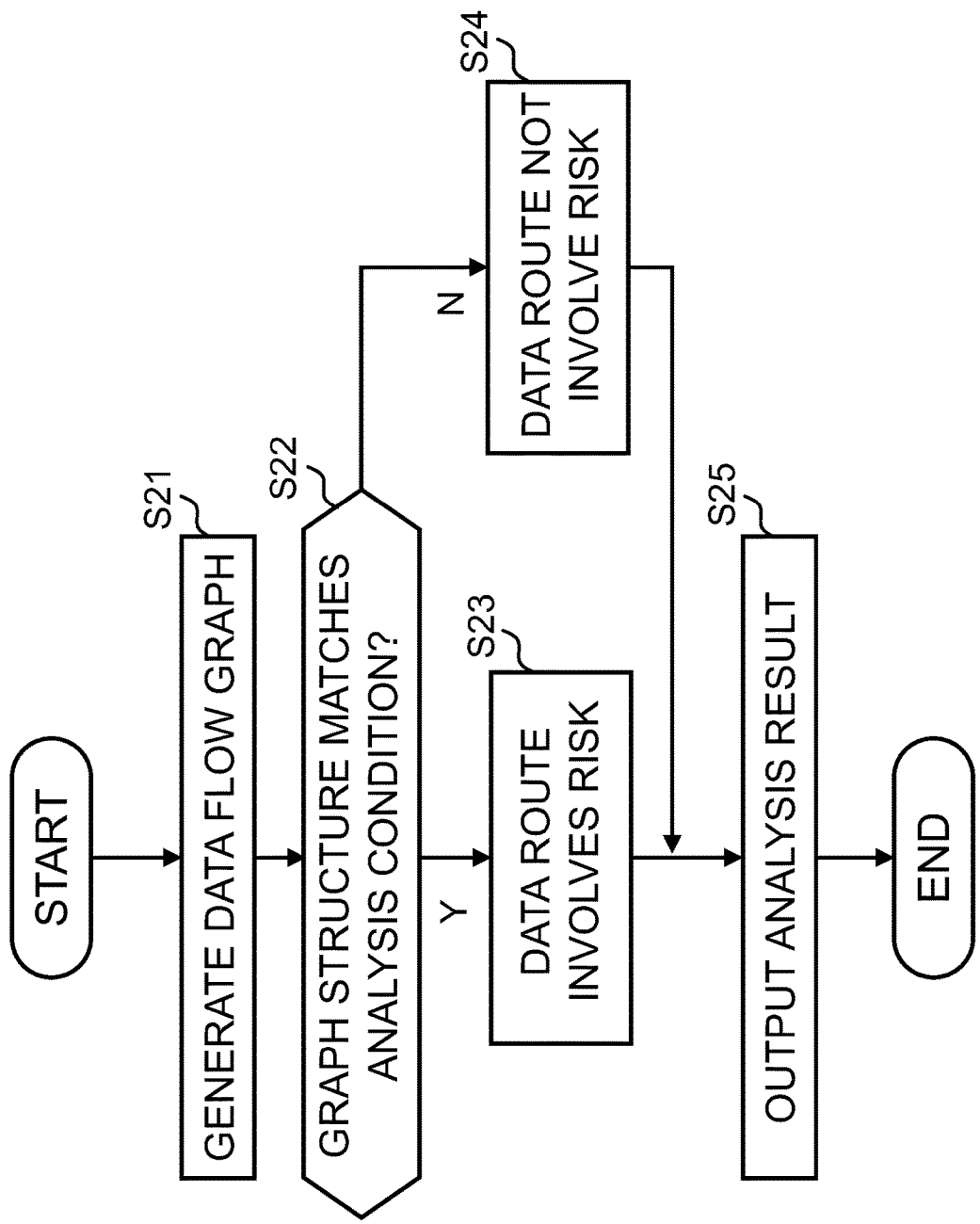
FIG. 9 is a flowchart showing a flow in an analyzing processing according to the first example embodiment.

Next, with reference to FIG. 9, a flow in the analyzing processing in the analysis apparatus 2 is described. FIG. 9 is a flowchart showing the flow in the analyzing processing in the analysis apparatus 2.

The generating unit 220, in step S21, generates a data flow graph based on the historical information in the authentication system 3A collected by the historical information collecting unit 210.

Next, the analyzing unit 230, in step S22, determines whether the data flow graph generated in step S21 includes a graph structure that matches the analysis condition obtained from the analysis condition generating apparatus 1. It is assumed that the analysis condition output from the analysis condition generating apparatus 1 to the analysis apparatus 2 is the graph structural data.

If the data flow graph generated in step S21 includes the graph structure that matches the graph structural data output from the analysis condition generating apparatus 1 to the analysis apparatus 2 (step S22/Y), the analyzing unit 230, in step S23, determines that the data route indicated with the flow graph generated in step S21 involves the risk.

f the data flow graph generated in step S21 does not include the graph structure that matches the graph structural data output from the analysis condition generating apparatus 1 to the analysis apparatus 2 (step S22/N), the analyzing unit 230, in step S23, determines that the data route indicated with the flow graph generated in step S21 does not involve the risk.

The analysis condition output from the analysis condition generating apparatus 1 to the analysis apparatus 2 corresponds to the graph structural data in which a native concept included in the vulnerability information is abstracted. Therefore, in step S22, the analyzing unit 230 determines whether to involve the security risk based on the vulnerability defined in CVE and CVE, and the variant data for vulnerability.

Then, the analyzing unit 230, in step S25, outputs the result of analyzing whether to involve the security risk, and terminates the processing. It is noted that the analysis apparatus 2 may cause the display unit 18 to display the analysis result output in step S25.

As described above, according to the present example embodiment, a structure complying with a rule for the data flow in the system to be analyzed is extracted as the graph structural data from the natural sentence indicating the known vulnerability and threat, and is output as the analysis condition. When doing so, the structure complying with the rule for the data flow defined in the ontology can be extracted from the specific information indicating the known vulnerability and threat by representing the rule for the data flow as the ontology. Also, according to the present example embodiment, the ontology is defined by the operator for the analysis condition generating apparatus 1. Therefore, the analysis condition is generated for allowing for analyzing the security risk variant from the known vulnerability and threat by constructing the ontology in which the rule for the data flow in the system to be analyzed is abstracted.

Accordingly, in the analysis apparatus 2 allows for analyzing the security risk using the analysis condition in which the element extracted from the vulnerability information is abstracted. Therefore, if the data flow graph in the system to be analyzed includes the variant data of the graph structural data indicating the information defined to involve the security risk for the vulnerability information, it allows for obtaining the analysis result that the variant data included in the data flow graph in the system to be analyzed involves the security risk.

3. Modification of First Example Embodiment

Each of the CVE and CWE according to the first example embodiment is information disclosed on the internet, and is updated based on information provided from a vendor at daily basis. The analysis condition generating apparatus 1 according to a modification of the present example embodiment automatically updates the vulnerability information such as the CVE and CWE to generate the analysis condition.

<3.1. Functional Configuration of Analysis Condition Generating Apparatus>

Figure 10:
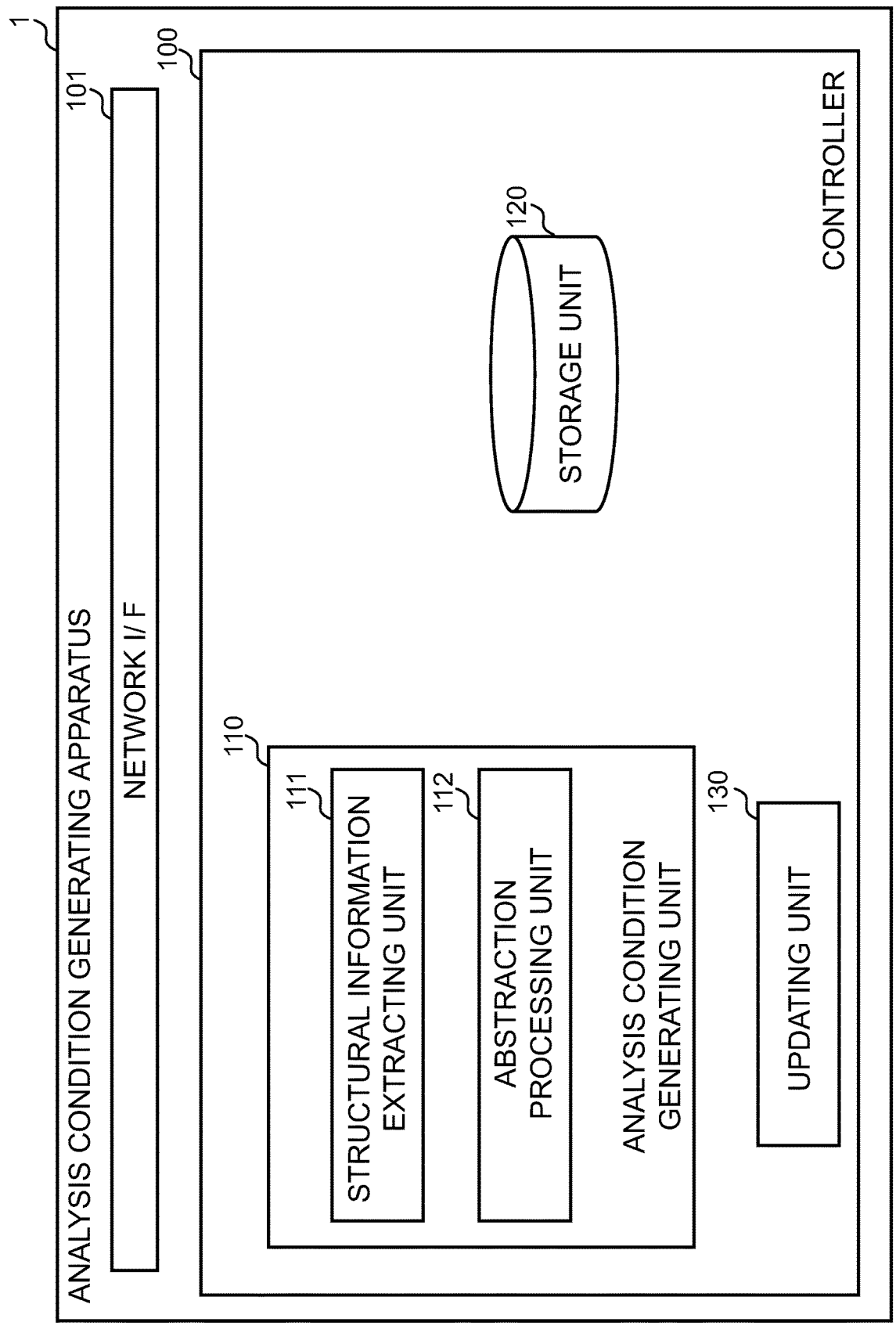
FIG. 10 is a functional block diagram showing a functional configuration of the analysis condition generating processing according to a modification of the first example embodiment.

With reference to FIG. 10 a functional configuration of an analysis condition generating apparatus 1 is described according to the present example embodiment. FIG. 10 is a functional block diagram showing the functional configuration of the analysis condition generating apparatus 1 according to the modification of the first example embodiment. It is noted that the identical configuration in FIG. 10 to that in FIG. 4 is denoted by the identical reference number, and overlapping description is omitted.

As shown in FIG. 10, the analysis condition generating apparatus 1 according to the modification of the present example embodiment includes an analysis condition generating unit 110, a storage unit 120, and an updating unit 130. The analysis condition generating unit 110 and the storage unit 120 are identical to those in FIG. 4, and description is omitted.

The updating unit 130 obtains the vulnerability information over the network 7, and updates the vulnerability information stored on the storage unit 120. Also, the updating unit 130 may obtain based on the analysis result by the analysis apparatus 2, over the network 7 the information indicating the vulnerability in the system to be analyzed that is defined by the operator for the analysis apparatus 2, and update the vulnerability information stored on the storage unit 120.

In the modification of the present example embodiment, the latest CVE and CWE disclosed on the internet and the analysis result by the analysis apparatus 2 are obtained, and the vulnerability information stored on the analysis condition generating apparatus 1 is updated. In this way, the analysis condition generating apparatus 1 can generate the analysis condition on which the latest vulnerability information on the system to be analyzed is reflected.

4. Second Example Embodiment

According to the first example embodiment, an example aspect in which the analysis condition generating apparatus 1 abstracts the graph structural data extracted using the ontology, and transmits to the analysis apparatus 2 is described. A second example embodiment is different from the first example embodiment in that the analysis condition generating apparatus 1 extracts the graph structural data from the natural sentence using the ontology, and the analyzing processing apparatus 4 abstracts the graph structural data. Hereinafter, with reference to FIG. 11 to FIG. 14, the second example embodiment of the present invention is described. It is noted that the identical element according to the second example embodiment to that according to the first example embodiment is denoted by the identical reference number, and overlapping description is omitted.

<4.1. Operational Style of Analysis System>

Figure 11:
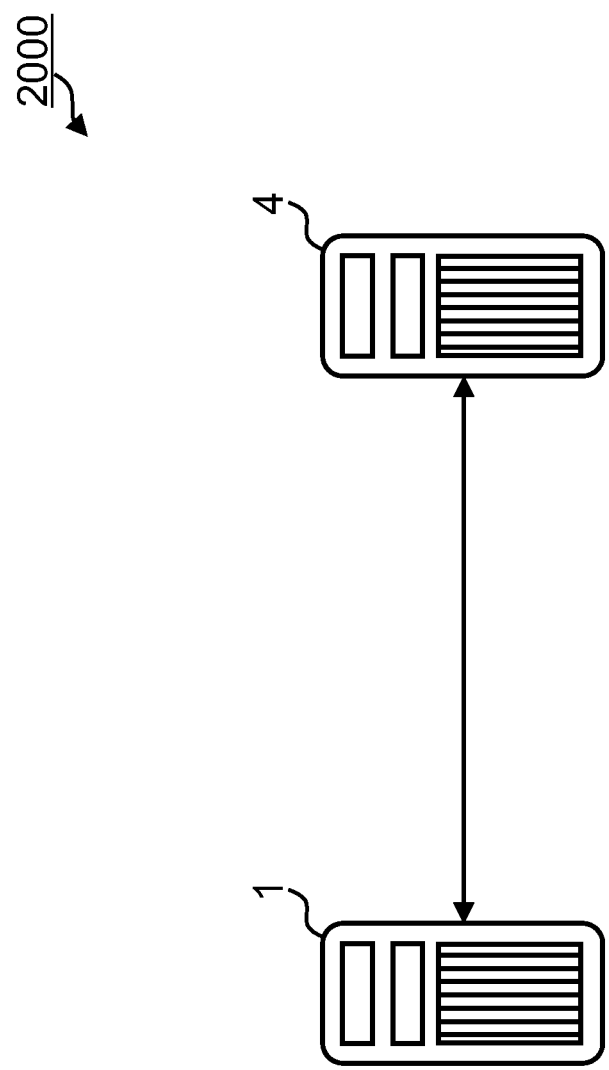
FIG. 11 is a diagram showing an operational style of an analysis system according to a second example embodiment.

Firstly, with reference to FIG. 11, an operational style in an analysis system 2000 is described according to the second example embodiment. FIG. 11 is a diagram showing the operational style in the analysis system 2000 according to the second example embodiment. As shown in FIG. 11, the analysis system 2000 is configured such that the analysis condition generating apparatus 1 and the analyzing processing apparatus 4 are connected over the network 7.

The analysis condition generating apparatus 1 generates the analysis condition for analyzing the security risk in the analyzing processing. The analysis condition generating apparatus 1 is an example of a first apparatus according to the present example embodiment.

The analyzing processing apparatus 4 analyzes based on the analysis condition generated by the analysis condition generating apparatus 1, the security risk for the data flow graph indicating the data flow in the system to be analyzed. The analyzing processing apparatus 4 is an example of a second apparatus according to the present example embodiment.

<4.2. Functional Configuration of Analysis Condition Generating Apparatus>

Figure 12:
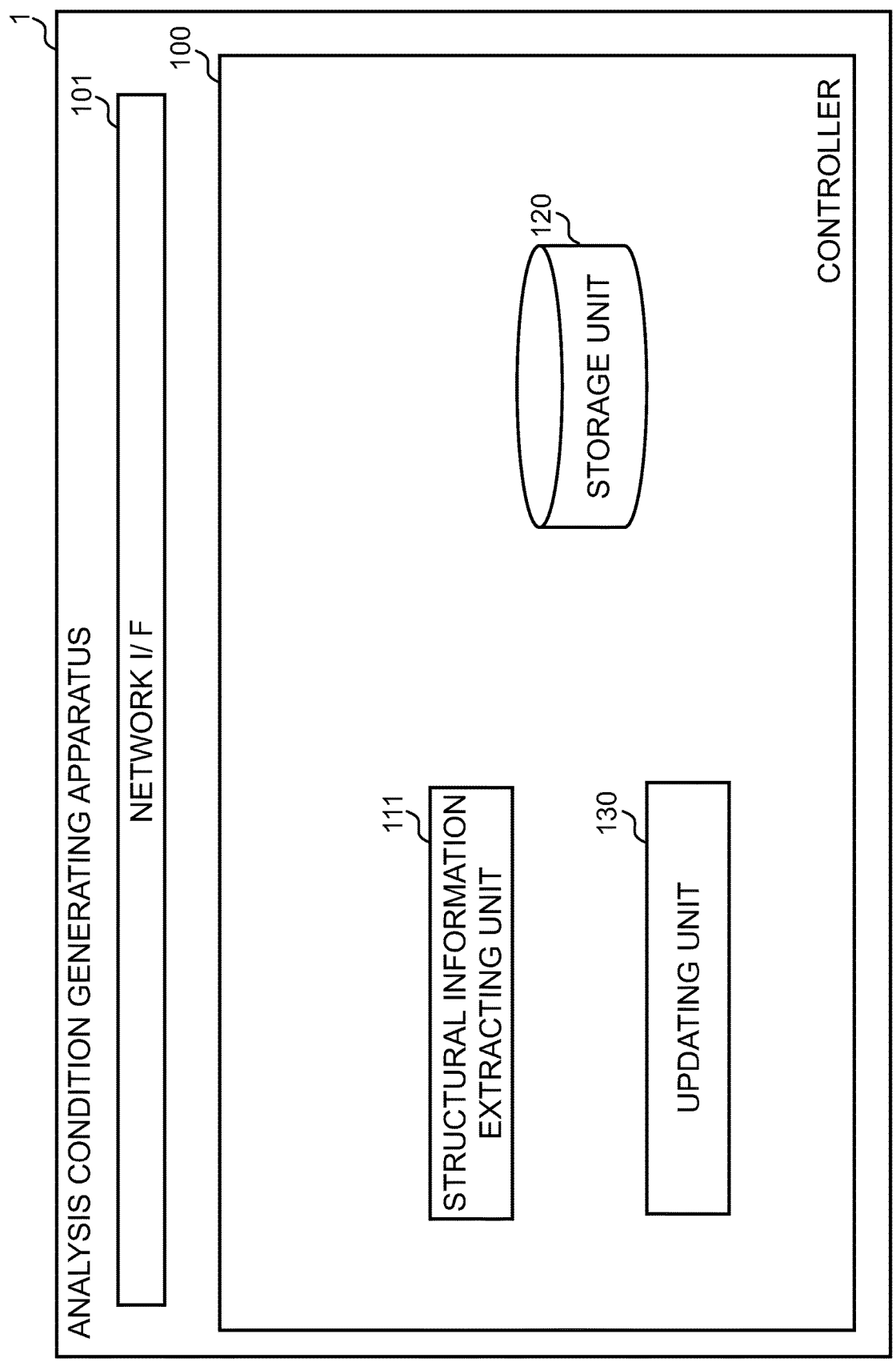
FIG. 12 is a functional block diagram showing a functional configuration of an analysis condition generating apparatus according to the second example embodiment.

Next, with reference to FIG. 12, a functional configuration of the analysis condition generating apparatus 1 is described according to the present example embodiment. FIG. 12 is a functional block diagram showing the functional configuration of the analysis condition generating apparatus 1 according to the present example embodiment.

As shown in FIG. 10, the analysis condition generating apparatus 1 according to a modification of present example embodiment includes a structural information extracting unit 111 and a storage unit 120. It is note that an updating unit 130 may be included other than the above-mentioned element. The structural information extracting unit 111, the storage unit 120, and the updating unit 130 are identical to those in FIG. 4 or FIG. 10, and description is omitted.

<4.3. Functional Configuration of Analyzing Processing Apparatus>

Figure 13:
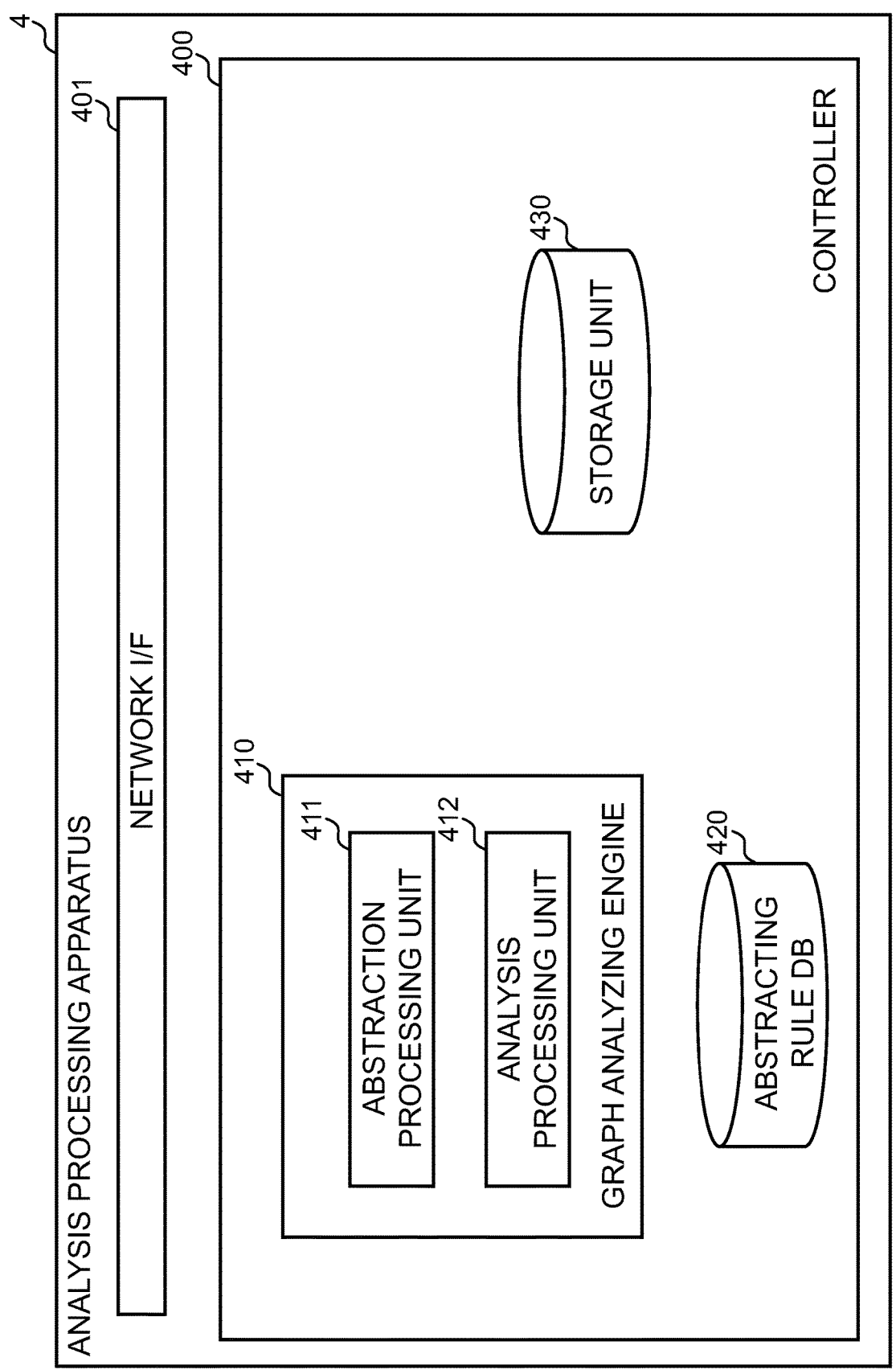
FIG. 13 is a functional block diagram showing a functional configuration of an analysis apparatus according to the second example embodiment.

Next, with reference to FIG. 13, a functional configuration of the analyzing processing apparatus 4 is described according to the present example embodiment. FIG. 13 is a functional block diagram showing the functional configuration of the analyzing processing apparatus 4 according to the present example embodiment. As shown in FIG. 13, the analyzing processing apparatus 4 includes a controller 400 configured to control an entire operation of the analyzing processing apparatus 4, and a network I/F 401 configured to input and output information to/from the controller 400. The element included in the analyzing processing apparatus 4 shown in FIG. 13 is implemented by a combination of the software controlling unit and the hardware included in the analyzing processing apparatus 4, the software controlling unit is configured by the CPU 11 of the analyzing processing apparatus 4 performing the calculation according to the program stored on the ROM 12 of the analyzing processing apparatus 4 and the program loaded from the storage medium 14 of the analyzing processing apparatus 4 to the RAM 13 of the analyzing processing apparatus 4.

The controller 400 includes a graph analyzing engine 410, an abstracting rule DB 420, and a storage unit 430, and analyzes based on the information obtained over the network I/F 101, the security risk for the system to be analyzed. The controller 400 is configured by installing a dedicated software program in the analyzing processing apparatus 4.

As shown in FIG. 13, the graph analyzing engine 410 includes an abstraction processing unit 411 and an analysis processing unit 412. The abstraction processing unit 411 performs an abstracting processing for transforming into an abstract representation based on an abstracting rule stored on the abstracting rule DB 420, a named entity included in the graph structural data that is obtained via the network I/F 101. It is noted that the abstraction processing unit 411 may perform the abstracting processing with a natural language processing. The analysis processing unit 412 analyzes based on the graph structural data after the abstracting processing, the security risk for the system to be analyzed. The abstracting processing performed by the abstraction processing unit 411 is identical to the abstracting processing performed by the abstraction processing unit 112 according to the first example embodiment (see FIG. 7B and FIG. 8). Also, the analyzing processing performed by the analysis processing unit 412 is identical to the analyzing processing performed by the analyzing unit 230 according to the first example embodiment (see FIG. 9).

The abstracting rule DB 420 corresponds to a storage area for storing the abstracting rule that is a rule for abstracting the graph structural data in performing the abstracting processing. The following abstracting rule is stored on the abstracting rule DB 420 for example.

For example, the information is stored on the abstracting rule DB 420 for transforming the unique identifier for the node and the edge into the abstraction identifier depending on the type of node and the type of edge. It allows for the abstraction processing unit 112 to abstract the concept of node and the edge included in the graph structural data to the extent that the type of node can be identified to be which element other than the process, data store and communication socket, and the node and edge do not include the named entity.

For example, the abstracting rule is stored on the abstracting rule DB 420 for identifying the type of each of nodes based on the extension and header information of the node, and transforming the unique identifier "AYj3A" into the abstraction identifier "Process", transforming the unique identifier "xni4G" into the abstraction identifier "File", and transforming the unique identifier "BNWjf" into the abstraction identifier "Directory". It is assumed that the graph structural data includes a node with the type of node being the process and with the unique identifier "AYj3A", a node with the type of node being the file and with the unique identifier "xni4G", and a node with the type of node being the directory and with the unique identifier "BNWjf". In this case, if the graph structural data includes a plurality of nodes with the same type of node according to the abstracting rule, the plurality of nodes can be abstracted to the abstraction identifier "Process1" and the abstraction identifier "Process2" for example in the way in which each of the plurality of nodes can be identified.

Also, for example, the abstracting rule is stored on the abstracting rule DB 420 for transforming the unique identifier "Tanaka" into the abstraction identifier "Admin" indicating an administrator and transforming the unique identifier "Yamada" into the abstraction identifier "Non-Admin" indicating the non-administrator. It is assumed that the graph structural data includes a node with the type of node being the file and with the unique identifier "Tanaka" indicating a file owner and a node with the type of node being the process and with the unique identifier "Yamada" indicating an executer of process. In this case, the abstraction processing unit 411 can transform the unique identifier "Tanaka" into the abstraction identifier "Admin" indicating the administrator and transform the unique identifier "Yamada" into the abstraction identifier "Non-Admin" indicating the non-administrator according to the abstracting rule. It is noted that if the graph structural data includes as the abstracting rule, a plurality of nodes with the unique identifier indicating the user name, it may store the information on abstracting the plurality of nodes to the abstraction identifier "Admin1" and the abstraction identifier "Admin2" for example in the way in which each of the plurality of nodes can be identified.

Also, the abstracting rule is stored on the abstracting rule DB 420 for abstracting the unique identifier "8.8.8.8" indicating an IP address to a "Global IP" (or "Local IP") based on the IP address included in a node of the communication socket for example. It is assumed that the graph structural data includes a node with the type of node being the communication socket and with the unique identifier "8.8.8.8" indicating the IP address. The abstraction processing unit 411 can abstract the unique identifier "8.8.8.8" indicating the IP address to the "Global IP (or "Local IP") based on the abstracting rule. It is noted that he the graph structural data includes as the abstracting rule, a plurality of nodes with the unique identifier indicating the IP address, it may store the information on abstracting based on the abstracting rule, the IP address of the unique identifier of each node to the "Local IP 1" and the "Local IP 2" for example in the way in which each of the plurality of nodes can be identified.

Also, the abstracting rule is stored on the abstracting rule DB 420 for abstracting to "**" indicating any port number, the port number included in the node of communication socket for example. It is assumed that the graph structural data includes a node with the type of node being the communication socket and with the port number "647X". The abstraction processing unit 411 abstracts to "**" indicating any port number, the port number "647X" included in the node of communication socket for example. It is noted that for the port with the numbers 0 to 1023 (i.e. well-known-port) for using the well-known service and protocol among the port number for the TCP and UDP, the information indicating the specific numeric value may be stored as the abstracting rule.

In this way, the abstraction processing unit 411, if including a plurality of nodes with the same type, performs the abstracting processing in the way in which each of the plurality of nodes can be identified.

<4.4. Flow in Analyzing Processing>

Figure 14:
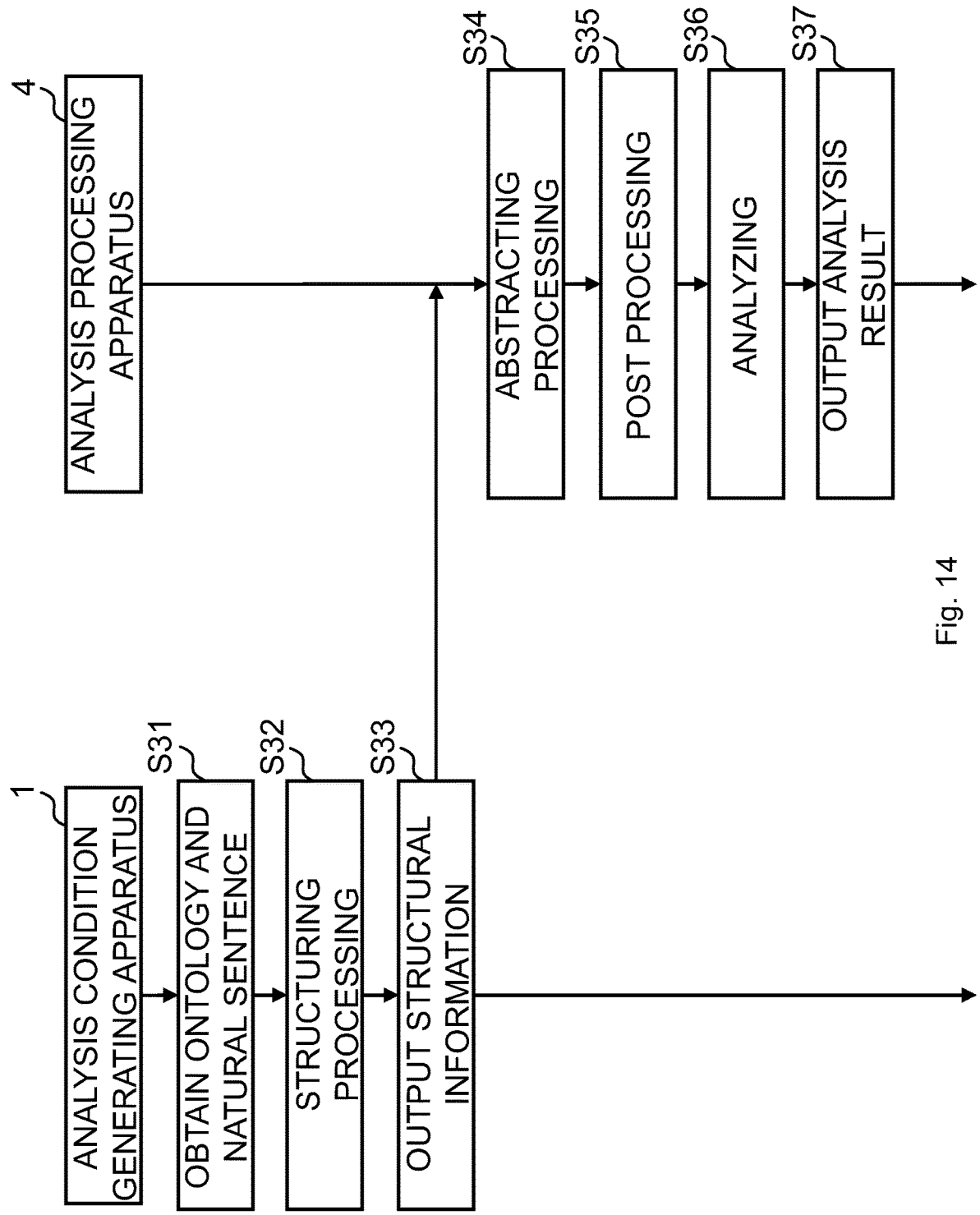
FIG. 14 is a sequence diagram showing a flow in an analyzing processing in the analysis system according to the second example embodiment.

Next, with reference to FIG. 14, a flow in the analyzing processing in the analysis system 2000 is described. FIG. 14 is a sequence diagram showing the flow in the analyzing processing in the analysis system 2000.

According to the present example embodiment, the ontology is constructed by the operator operating the analysis condition generating apparatus 1. The operator operating the analysis condition generating apparatus 1 constructs the ontology used in generating the analysis condition based on the data flow graph indicating the data flow in the system to be analyzed (e.g., authentication system 3A) for example. It is noted that the operator operating the analysis condition generating apparatus 1 may construct the ontology by referring the vulnerability information when constructing the ontology.

Firstly, in step S31, the structural information extracting unit 111 obtains the ontology (see FIG. 5B) and the natural sentence (see FIG. 7A) stored on the storage unit 120. Then, in step S32, the structural information extracting unit 111 performs the structuring processing based on the ontology and the natural sentence obtained in step S31. Specifically, the structural information extracting unit 111 extracts from the natural sentence, the graph structural data (see FIG. 7B) applied to the relation between the concepts defined in the ontology in the structuring processing.

Then, the structural information extracting unit 111, in step S33, outputs to the analyzing processing apparatus 4, the graph structural data extracted from the natural sentence in step S32.

In step S34, the abstraction processing unit 411 abstracts the graph structural data received from the analysis condition generating apparatus 1. Specifically, the abstraction processing unit 411 transforms into the abstraction identifier, the unique identifier for the node and the edge included in the graph structural data according to the abstracting rule stored on the abstracting rule DB (see FIG. 8). In step S34, the abstraction processing unit 411 abstracts the concept of node and edge included in the graph structural data to the extent that the type of node can be identified to be which element other than the process, data store and communication socket, and the node and edge do not include the named entity.

In this way, the graph structural data abstracted by the abstraction processing unit 112 corresponds to the graph structural data less abstracted than the ontology input in the analysis condition generating apparatus 1 in step S31, and more abstracted than the graph structural data extracted by the structural information extracting unit 111 in step S32.

In step S35, the graph analyzing engine 410 performs the post processing for the graph structural data. According to the present example embodiment, the graph analyzing engine 410 performs as the post processing, a processing for editing the abstracted graph structural data according to a rule preset by the operator for the analyzing processing apparatus 4, and a processing for managing non-significant graph structural data distinguished from the graph structural data used for analyzing the security risk when analyzing the security risk for the system to be analyzed for example. It is noted that step S35 can be omitted.

For example, the graph analyzing engine 410 may perform the post processing for the graph structural data abstracted in step S34 to use as the analysis condition, the graph structural data in a form of DOT language and JSON consisting of the node and the edge. Also, the graph analyzing engine 410 may output the analysis condition in a form of graph search language. In this case, the graph analyzing engine 410 performs the post processing for representing the graph structural data abstracted in step S34 with the search language such as Cypher and Gremlin. Since the search language such as Cypher and Gremlin is in a text form, the operator for the analyzing processing apparatus 4 can edit using an editor. Also, the operator for the analyzing processing apparatus 4 may intuitively edit and modify by creating the editor for visualize as the graph, the data represented with the search language such as Cypher and Gremlin.

In step S36, the analysis processing unit 412 determines whether the data flow graph includes the graph structure that matches the analysis condition. In step S36, the process performed by the analysis processing unit 412 corresponds to step S22 to step S24 in the flowchart in FIG. 9.

In step S36, the data flow graph for which the analysis processing unit 412 to analyze the security risk may be generated by the analyzing processing apparatus 4 obtaining the historical information on the system to be analyzed. Alternatively, it may cause the information processing apparatus (not shown) connected to the analyzing processing apparatus 4 to generate the data flow graph by inputting the historical information on the system to be analyzed and to transmit to the analyzing processing apparatus 4.

In step S37, the analysis processing unit 412 outputs the analysis result in step S36, and terminates the processing. It is noted that the analysis processing unit 412 may cause the display unit 18 to display the analysis result output in step S37.

As described above, according to the present example embodiment, a structure complying with a rule for the data flow in the system to be analyzed is extracted as the graph structural data from the natural sentence indicating the known vulnerability and threat, and is output as the analysis condition. When doing so, the structure complying with the rule for the data flow defined in the ontology can be extracted from the specific information indicating the known vulnerability and threat by representing the rule for the data flow as the ontology. Also, according to the present example embodiment, the ontology is constructed by the operator for the analysis condition generating apparatus 1. Therefore, the analysis condition is generated for allowing for analyzing the security risk variant from the known vulnerability and threat by constructing the ontology in which the rule for the data flow in the system to be analyzed is abstracted.

Accordingly, the analyzing processing apparatus 4 allows for analyzing the security risk using the analysis condition in which the element extracted from the vulnerability information is abstracted. Therefore, if the data flow graph in the system to be analyzed includes the variant data of the graph structural data indicating the information defined to involve the security risk in the vulnerability information, it allows for obtaining the analysis result that the variant data included in the data flow graph in the system to be analyzed involves the security risk.

Also, according to the present example embodiment, the processing for generating the analysis condition used for analyzing the security risk can be performed in a distributed manner between the analysis condition generating apparatus 1 and the analyzing processing apparatus 4. In this way, it can suppress the increase of processing load with the natural language processing for the analysis condition generating apparatus 1.

5. Third Example Embodiment

Figure 15:
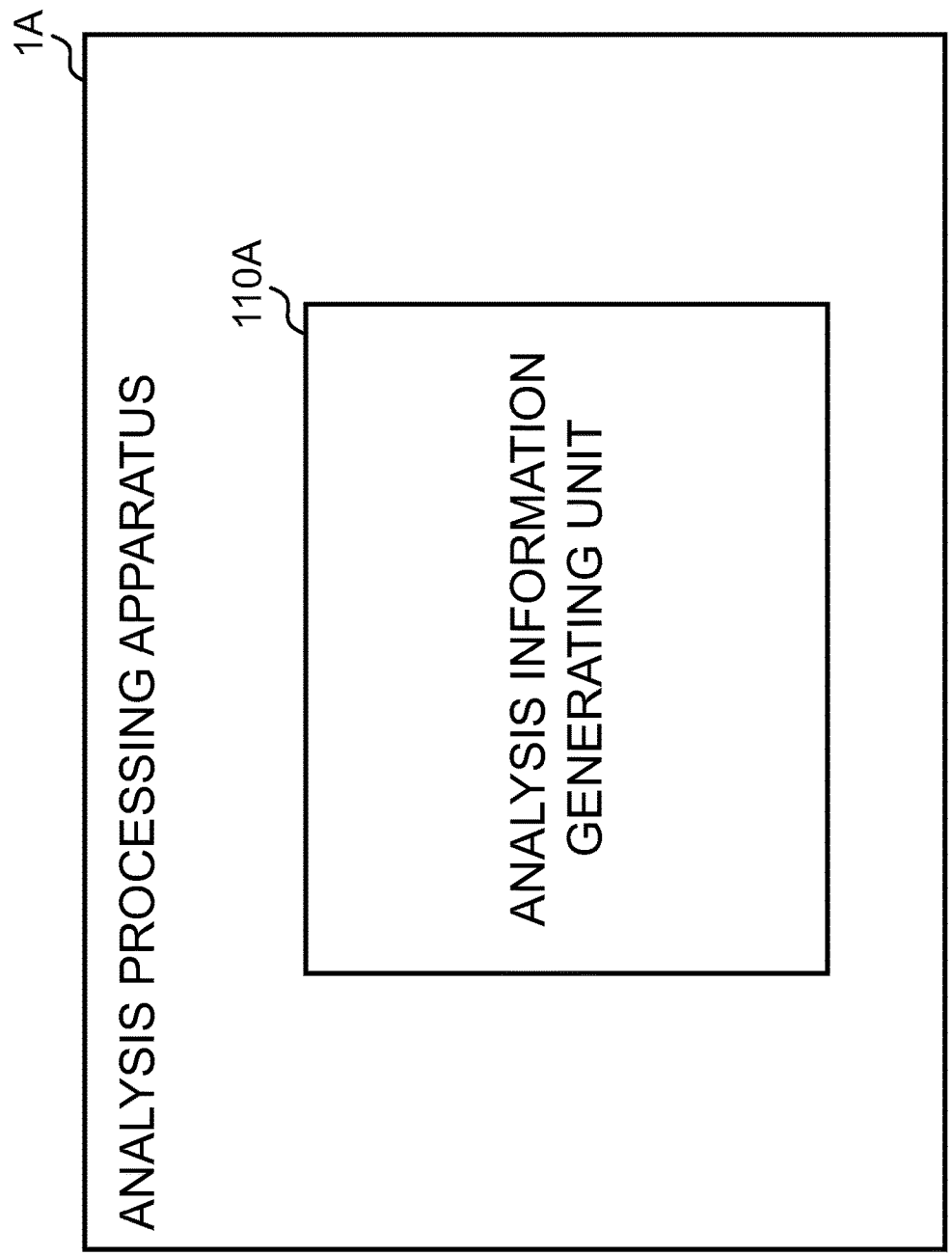
FIG. 15 is a diagram showing a configuration of an analysis condition generating apparatus according to a third example embodiment.

Next, with reference to FIG. 15, a third example embodiment is described according to the present invention. The above-mentioned first example embodiment is a specific example embodiment while the third example embodiment is a general example embodiment. According to the following third example embodiment, an effect is provided similar to that according to the first example embodiment.

FIG. 15 is a block diagram showing a schematic configuration of an analysis condition generating apparatus 1A according to the third example embodiment of the present invention. As shown in FIG. 15, the analysis condition generating apparatus 1A includes an analysis condition generating unit 110A.

The analysis condition generating unit 110A generates from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, and generates based on the graph structural data, the analysis condition for analyzing the security risk for the system to be analyzed.

Relation with First Example Embodiment

As an example, the analysis condition generating apparatus 1A according to the third example embodiment may perform the operation of the analysis condition generating apparatus 1 according to the first example embodiment. In this case, the description for the first example embodiment can be applied to the third example embodiment. It is noted that the third example embodiment is not limited to the above example.

6. Fourth Example Embodiment

Figure 16:
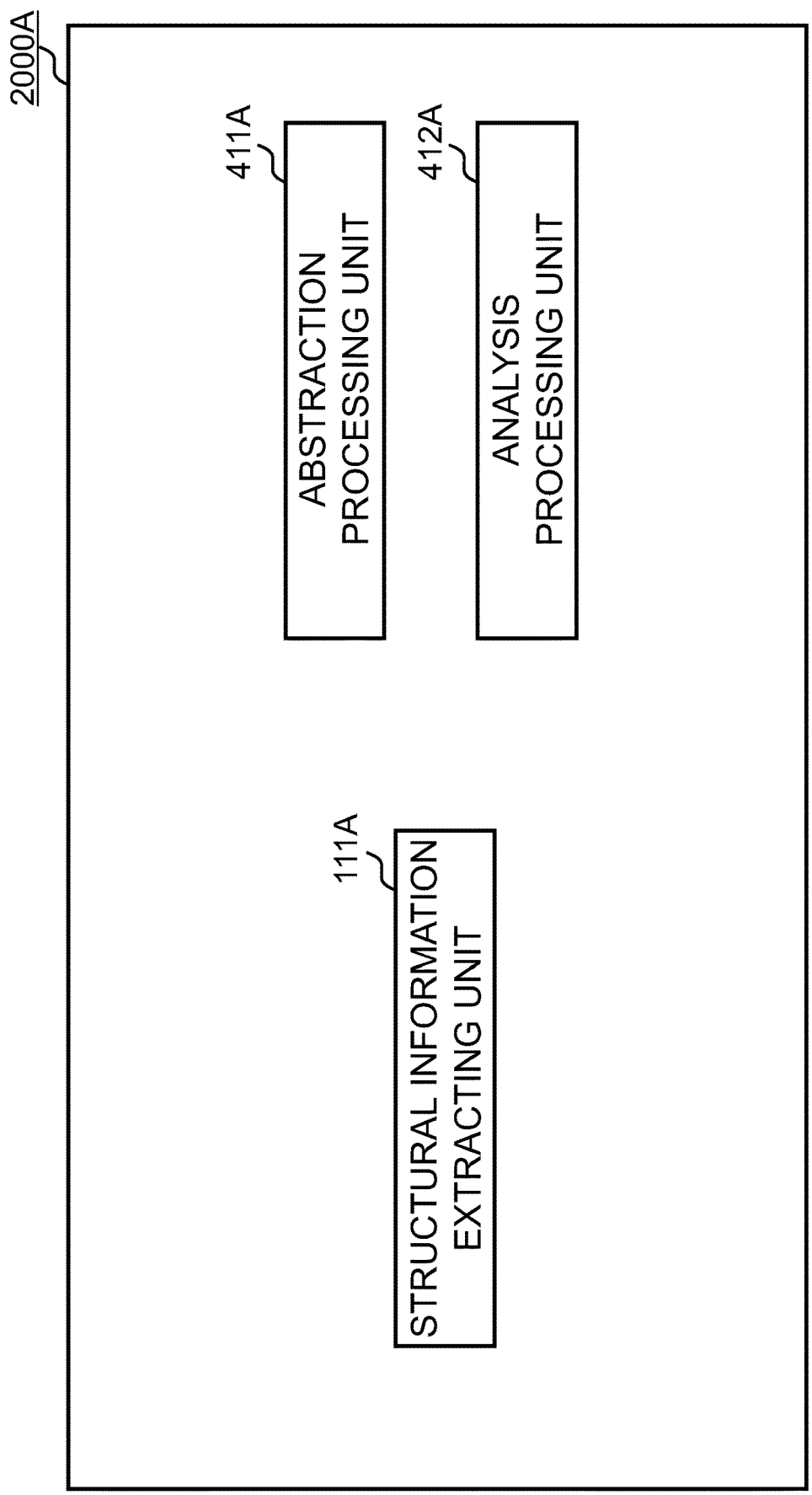
FIG. 16 is a diagram showing a configuration of an analysis system according to a fourth example embodiment.

Next, with reference to FIG. 16, a fourth example embodiment is described according to the present invention. The above-mentioned second example embodiment is a specific example embodiment while the fourth example embodiment is a general example embodiment. According to the following fourth example embodiment, an effect is provided similar to that according to the second example embodiment.

FIG. 16 is a block diagram showing a schematic configuration of an analysis system 2000A according to the fourth example embodiment. As shown in FIG. 16, the analysis system 2000A includes a structural information extracting unit 111A, an abstraction processing unit 411A, and an analysis processing unit 412A.

The structural information extracting unit 111A extracts from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges.

The abstraction processing unit 411A transforms into the abstraction identifier, the unique identifier for the node and the edge included in the graph structural data based on the abstracting rule.

The analysis processing unit 412A analyzes security risk for the system to be analyzed based on an analysis condition generated from the graph structural data in which a unique identifier is transformed into an abstraction identifier.

Relation with Second Example Embodiment

As an example, the analysis system 2000A according to the fourth example embodiment may perform the operation of the analysis system 2000 according to the second example embodiment. In this case, the description for the second example embodiment can be applied to the fourth example embodiment. It is noted that the fourth example embodiment is not limited to the above example.

7. Other Example Embodiment

As mentioned above, an example embodiment of the present invention is described, the present invention is not limited to the example embodiment. One skilled in the art will understand that the example embodiment is merely illustrative, and may modified without departing from a scope and a spirit of the present invention.

For example, the steps in the processing described in the detailed description may not necessarily be performed in time series in the order described in the flowchart and the sequence diagram. For example, the steps in the processing may be performed in an order different from that described in the flowchart and the sequence diagram or may be performed in parallel. Some of the steps in the processing may be omitted, or more steps may be added to the processing.

An apparatus including a component in the analysis condition generating apparatus 1 (e.g., an element corresponding each unit included in the analysis condition generating unit 110) described in the detailed description may be provided. Also, a method including a processing performed by the above component may be provided, and a program for causing a processor to execute the processing performed by the above component may be provided. Further, a non-transitory computer readable medium storing the program may be provided. Of course, the present invention encompasses such apparatus, module, method, program, and non-transitory computer readable medium.

The whole or part of the above example embodiment disclosed can be described as, but not limited to, the following supplementary notes.

Supplementary Note 1

An analysis condition generating apparatus comprising:
an analysis condition generating unit configured to generate from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, and generate based on the graph structural data, an analysis condition for analyzing security risk for the system to be analyzed.

Supplementary Note 2

The analysis condition generating apparatus according to supplementary note 1, wherein
the ontology has an abstraction identifier indicating a type of the node and a type of the edge, and
the type of the node includes a process on the data flow graph, a data store, a communication socket, and an outer actor other than the process, the data store and the communication socket.

Supplementary Note 3

The analysis condition generating apparatus according to supplementary note 2, wherein
the analysis condition generating unit includes:
a structural information extracting unit configured to extract the graph structural data from the natural sentence based on the ontology; and
an abstraction processing unit configured to transform into the abstraction identifier based on the ontology, the unique identifier for the node and the edge included in the graph structural data.

Supplementary Note 4

The analysis condition generating apparatus according to supplementary note 2 or 3, wherein
a node indicating the process among the nodes has an attribute indicating an execution permission for the process, and a node indicating the data store among the nodes has an attribute indicating an access permission for the data store.

Supplementary Note 5

The analysis condition generating apparatus according to any of supplementary notes 1 to 4, further comprising
an updating unit configured to update the natural sentence.

Supplementary Note 6

The analysis condition generating apparatus according to any of supplementary notes 1 to 5, wherein
the analysis condition generating unit generates the graph structural data by performing a natural language processing using the ontology for the natural sentence.

Supplementary Note 7

The analysis condition generating apparatus according to any of supplementary notes 1 to 6, wherein
the natural sentence is character information indicating the security risk for the system to be analyzed.

Supplementary Note 8

An analysis system comprising:
a structural information extracting unit configured to extract from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges;
an abstraction processing unit configured to transform into an abstraction identifier based on an abstracting rule, a unique identifier for the node and the edge included in the graph structural data; and
an analysis processing unit configured to analyze security risk for the system to be analyzed based on an analysis condition generated from the graph structural data in which the unique identifier is transformed into the abstraction identifier.

Supplementary Note 9

The analysis system according to supplementary note 8, wherein
the abstraction identifier is an identifier indicating a type of the node and a type of the edge,
the type of the node includes a process on the data flow graph, a data store, a communication socket, and an outer actor other than the process, the data store and the communication socket, and
the abstracting rule is information on transforming the unique identifier into the abstraction identifier depending on the type of the node and the type of the edge.

Supplementary Note 10

The analysis system according to supplementary note 9, wherein a node indicating the process among the nodes has an attribute indicating an execution permission for the process, and
a node indicating the data store among the nodes has an attribute indicating an access permission for the data store.

Supplementary Note 11

The analysis system according to any of supplementary notes 8 to 10, comprising:
a first apparatus including the structural information extracting unit; and
a second apparatus including the abstraction processing unit and the analysis processing unit, and different from the first apparatus.

Supplementary Note 12

The analysis system according to supplementary note 11, wherein
the first apparatus includes an updating unit configured to update the natural sentence.

Supplementary Note 13

The analysis system according to any of supplementary notes 8 to 12, wherein
the structural information extracting unit generates the graph structural data by performing a natural language processing using the ontology for the natural sentence.

Supplementary Note 14

The analysis system according to any of supplementary notes 8 to 13, wherein
the natural sentence is character information indicating security risk on the system to be analyzed.

Supplementary Note 15

An analysis condition generating program causing a processor to perform:
generating from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, and generating an analysis condition for analyzing security risk for the system to be analyzed based on the graph structural data.

Supplementary Note 16

An analysis program causing a processor to perform:
extracting from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges;
transforming into an abstraction identifier based on an abstracting rule, a unique identifier for the node and the edge included in the graph structural data; and analyzing security risk for the system to be analyzed based on an analysis condition generated from the graph structural data in which the unique identifier is transformed into the abstraction identifier.

Supplementary Note 17

An analysis condition generating method comprising generating from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, and generating based on the graph structural data, an analysis condition for analyzing security risk for the system to be analyzed.

Supplementary Note 18

An analysis method comprising:
extracting from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges;
transforming into an abstraction identifier based on an abstracting rule, a unique identifier for the node and the edge included in the graph structural data; and
analyzing security risk for the system to be analyzed based on an analysis condition generated from the graph structural data in which the unique identifier is transformed into the abstraction identifier.

INDUSTRIAL APPLICABILITY

An analysis condition for security risk for a data flow in a system to be analyzed is automatically generated.

REFERENCE SIGNS LIST 1, 1A Analysis Condition Generating Apparatus
2 Analysis Apparatus
3A Authentication System
4 Analyzing Processing Apparatus
110, 110A Analysis Condition Generating Unit
111, 111A Structural Information Extracting Unit
112 Abstraction Processing Unit
130 Updating Unit
210 Historical Information Collecting Unit
220 Generating Unit
230 Analyzing Unit
411, 411A Abstraction Processing Unit
412, 412A Analysis Processing Unit
420 Abstracting Rule DB
1000, 2000, 2000A Analysis System

What is claimed is:

1. An analysis condition generating apparatus comprising:
a memory storing instructions; and
one or more processors configured to execute the instructions to:
generate from a natural sentence, using ontology in which a relationship is described between one or more nodes on a data flow graph that indicates a data flow in a system to be analyzed and one or more edges that indicate an event related to the nodes, the ontology having an abstraction identifier indicating a type of a node and a type of an edge, the type of the node including a process on the data flow graph, a data store, a communication socket, and an outer actor other than the process, the data store and the communication socket, graph structural data indicating the relationship between the nodes and the edges, and generate based on the graph structural data, an analysis condition for analyzing security risk for the system to be analyzed.

2. The analysis condition generating apparatus according to claim 1, wherein
the one or more processors are configured to execute the instructions to:
extract the graph structural data from the natural sentence based on the ontology; and
transform into the abstraction identifier based on the ontology, the unique identifier for the node and the edge included in the graph structural data.

3. The analysis condition generating apparatus according to claim 1, wherein
a node indicating the process among the nodes has an attribute indicating an execution permission for the process, and
a node indicating the data store among the nodes has an attribute indicating an access permission for the data store.

4. The analysis condition generating apparatus according to claim 1, wherein
the one or more processors are configured to execute the instructions to update the natural sentence.

5. The analysis condition generating apparatus according to claim 1, wherein
the one or more processors are configured to execute the instructions to generate the graph structural data by performing a natural language processing using the ontology for the natural sentence.

6. The analysis condition generating apparatus according to claim 1, wherein
the natural sentence is character information indicating the security risk for the system to be analyzed.

7. An analysis system comprising:
a memory storing instructions; and
one or more processors configured to execute the instructions to:
extract from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges;
transform into an abstraction identifier based on an abstracting rule, a unique identifier for the node and the edge included in the graph structural data,
the abstraction identifier is an identifier indicating a type of the node and a type of the edge,
the type of the node includes a process on the data flow graph, a data store, a communication socket, and an outer actor other than the process, the data store and the communication socket, and
the abstracting rule is information on transforming the unique identifier into the abstraction identifier depending on the type of the node and the type of the edge; and
analyze security risk for the system to be analyzed based on an analysis condition generated from the graph structural data in which the unique identifier is transformed into the abstraction identifier.

8. The analysis system according to claim 7, wherein
a node indicating the process among the nodes has an attribute indicating an execution permission for the process, and
a node indicating the data store among the nodes has an attribute indicating an access permission for the data store.

9. The analysis system according to claim 7, comprising:
a first apparatus that extracts the graph structural data from the natural sentence, using the ontology; and
a second apparatus that transforms the unique identifier into the abstraction identifier based on the abstracting rule and analyzes the security risk based the analysis condition, and different from the first apparatus.

10. The analysis system according to claim 9, wherein the first apparatus updates the natural sentence.

11. The analysis system according to claim 7, wherein the one or more processors are configured to execute the instructions to generate the graph structural data by performing a natural language processing using the ontology for the natural sentence.

12. The analysis system according to claim 7, wherein the natural sentence is character information indicating security risk on the system to be analyzed.

13. An analysis condition generating method comprising generating from a natural sentence, using ontology in which a relationship is described between one or more nodes on a data flow graph that indicates a data flow in a system to be analyzed and one or more edges that indicate an event related to the nodes, the ontology having an abstraction identifier indicating a type of a node and a type of an edge, the type of the node including a process on the data flow graph, a data store, a communication socket, and an outer actor other than the process, the data store and the communication socket, graph structural data indicating the relationship between the nodes and the edges, and generating based on the graph structural data, an analysis condition for analyzing security risk for the system to be analyzed.

14. An analysis method comprising:
extracting from a natural sentence, using ontology in which a relationship is described between one or more nodes on a data flow graph that indicates a data flow in a system to be analyzed and one or more edges that indicate an event related to the nodes, graph structural data indicating the relationship between the nodes and the edges, the ontology having an abstraction identifier indicating a type of a node and a type of an edge, the type of the node including a process on the data flow graph, a data store, a communication socket, and an outer actor other than the process, the data store and the communication socket;
transforming into an abstraction identifier based on an abstracting rule, a unique identifier for the node and the edge included in the graph structural data, the abstracting rule being information on transforming the unique identifier into the abstraction identifier depending on the type of the node and the type of the edge; and
analyzing security risk for the system to be analyzed based on an analysis condition generated from the graph structural data in which the unique identifier is transformed into the abstraction identifier.

* * * * *